US012800702B2

(12) United States Patent
Wang et al.

(10) Patent No.: US 12,800,702 B2
(45) Date of Patent: Nov. 17, 2026

(54) SYSTEM AND METHOD FOR DMG PASSIVE SENSING IN AN ENVIRONMENT

(71) Applicant: Mitsubishi Electric Research Laboratories, Inc., Cambridge, MA (US)

(72) Inventors: Pu Wang, Cambridge, MA (US); Petros Boufounos, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 272 days.

(21) Appl. No.: 18/621,583

(22) Filed: Mar. 29, 2024

(65) Prior Publication Data

US 2025/0306164 A1 Oct. 2, 2025

Related U.S. Application Data

(60) Provisional application No. 63/565,089, filed on Mar. 14, 2024.

(51) Int. Cl.

| | |
|---|---|
| ***G01S 7/00*** | (2006.01) |
| ***G01S 13/52*** | (2006.01) |
| ***G01S 13/87*** | (2006.01) |
| ***H04B 7/06*** | (2006.01) |
| ***H04W 16/28*** | (2009.01) |
| ***H04W 84/12*** | (2009.01) |

(52) U.S. Cl.

CPC .............. *G01S 7/006* (2013.01); *G01S 13/52* (2013.01); *G01S 13/87* (2013.01); *H04B 7/06952* (2023.05); *H04W 16/28* (2013.01); *H04W 84/12* (2013.01)

(58) Field of Classification Search

CPC ..... H04W 4/38; H04W 16/28; H04W 40/244; H04W 64/006; H04W 84/12; H04B 7/0617; H04B 7/0452; G01S 13/003; G01S 13/87; G01S 13/89; G01S 13/52; G01S 2013/0263

USPC .......................................... 342/59, 154, 368

See application file for complete search history.

(56) References Cited

U.S. PATENT DOCUMENTS

| | | | | |
|---|---|---|---|---|
| 6,850,186 B2 * | 2/2005 | Hellsten | ................ | G01S 13/878 367/90 |
| 7,038,618 B2 * | 5/2006 | Budic | ................... | G01S 13/003 342/159 |
| 7,369,083 B2 * | 5/2008 | Budic | ................... | G01S 13/003 342/159 |

(Continued)

*Primary Examiner* — Michael W Justice
(74) *Attorney, Agent, or Firm* — Gene Vinokur

(57) ABSTRACT

Various embodiments disclose passive directional multi-gigabit (DMG) sensing for object detection with millimeter Wi-Fi beacon frames. The DMG sensing comprises collecting a schedule of the multidirectional mmWave Wi-Fi beacon transmissions including times and directional sector of each mmWave packet in the directional beam training. Further, values of an occupancy map of an environment are evaluated statistically using a model connecting the schedule of the beacon transmissions with intra-packet measurements and inter-packet measurements of reflections of the multi-directional mmWave Wi-Fi beacon transmissions. These values of the occupancy map are then used to determine parameters of an object in the environment.

23 Claims, 16 Drawing Sheets

300

(56) References Cited

U.S. PATENT DOCUMENTS 7,639,171 B2 * 12/2009 Alland .................... H01Q 3/24 342/25 R
8,428,171 B2 * 4/2013 Fettweis ................ H01Q 1/246 375/267
8,467,733 B2 * 6/2013 Leabman ........... H04B 7/18506 455/431
8,614,643 B2 * 12/2013 Leabman ............. H01Q 3/2611 342/367
8,797,959 B2 * 8/2014 Razaviyayn ......... H04B 7/0634 370/328
8,923,189 B2 * 12/2014 Leabman ........... H04B 7/18506 455/13.1
9,052,386 B2 * 6/2015 Yeredor ................... H04N 5/76
9,176,223 B2 * 11/2015 Derham .................. G01S 13/04
9,178,593 B1 * 11/2015 Liu ......................... H04B 7/0834
9,615,374 B1 * 4/2017 Liu ...................... H04W 72/542
9,680,552 B2 * 6/2017 Ko ......................... H04L 5/0023
10,314,054 B2 * 6/2019 Pao ....................... H04L 1/1812
10,395,539 B2 * 8/2019 Slutsky ................... G01S 13/42
10,455,539 B2 * 10/2019 Raghavan .............. H04B 7/026
10,485,005 B2 * 11/2019 Pao ....................... H04W 72/21
10,863,474 B2 * 12/2020 Raghavan .............. H04B 7/026
10,989,805 B2 * 4/2021 Zwirn ................... G01S 13/874
11,102,793 B2 * 8/2021 Pao ......................... H04L 5/001
11,249,181 B2 * 2/2022 Koike-Akino ........ G01S 13/878
11,269,058 B2 * 3/2022 Harrison ................. G01S 7/415
11,288,895 B2 * 3/2022 Chandel ................ G06F 1/3231
11,327,156 B2 * 5/2022 Harrison ............... G01S 13/726
11,327,167 B2 * 5/2022 Vaishnav ................ G01S 13/72
11,360,192 B2 * 6/2022 Chandel ................ G06F 1/3231
11,460,541 B2 * 10/2022 Oren ....................... G01S 7/354
11,558,160 B2 * 1/2023 Choi ....................... G01S 7/006
11,587,204 B2 * 2/2023 Harrison ............... G01S 13/865
11,620,482 B2 * 4/2023 Li ......................... G06F 18/214 382/156
11,762,060 B2 * 9/2023 Zhang ................... G01S 13/931 342/107
11,888,554 B2 * 1/2024 Wu ........................ H04B 7/043
11,953,579 B2 * 4/2024 Jeannin ................. G01S 13/003
12,063,077 B2 * 8/2024 Jung ...................... G06N 3/045
12,066,518 B2 * 8/2024 Harrison ............... G01S 13/426
12,146,940 B2 * 11/2024 Park ...................... G01S 13/003
12,259,463 B2 * 3/2025 Tapia ...................... G01S 13/42
12,289,611 B2 * 4/2025 Park ...................... H04W 16/28
12,326,515 B2 * 6/2025 Ren ......................... G01S 7/282
12,348,983 B1 * 7/2025 Lin ....................... H04W 16/28
12,360,240 B2 * 7/2025 Zhang ............... B60W 30/0956
12,372,612 B2 * 7/2025 Born ..................... G01S 7/4004
12,411,228 B2 * 9/2025 Tyagi .................... G06T 3/4046
12,461,226 B2 * 11/2025 Han ...................... G01S 13/765
12,495,383 B2 * 12/2025 Ghazvinian Zanjani .................... G06N 3/088
12,523,762 B2 * 1/2026 Yoffe .................... G01S 13/931
12,546,881 B2 * 2/2026 Lin ....................... G01S 13/343
2005/0237236 A1 * 10/2005 Budic ................. G01S 13/5244 342/159
2007/0116095 A1 * 5/2007 Gerlach .............. H04L 27/2613 375/130
2007/0247353 A1 * 10/2007 Budic ................. G01S 13/5244 342/21
2009/0033745 A1 * 2/2009 Yeredor ........... G08B 13/19608 348/152
2010/0232529 A1 * 9/2010 Fettweis ................ H01Q 1/246 375/260
2011/0032149 A1 * 2/2011 Leabman ............... H01Q 3/267 342/368
2011/0032866 A1 * 2/2011 Leabman ............. H01Q 3/2611 370/316
2011/0034190 A1 * 2/2011 Leabman ............... H01Q 1/246 455/500
2011/0034191 A1 * 2/2011 Leabman ............. H01Q 3/2611 455/501
2012/0170442 A1 * 7/2012 Razaviyayn ......... H04B 7/0634 370/329
2013/0176161 A1 * 7/2013 Derham .................. G01S 13/04 342/27
2015/0163073 A1 * 6/2015 Jindal ................. H04L 25/0228 375/267
2015/0188622 A1 * 7/2015 Leabman ........... H04B 7/18506 370/316
2016/0050006 A1 * 2/2016 Ko ........................ H04W 72/20 370/329
2017/0287334 A1 * 10/2017 Slutsky ................... G01S 13/42
2018/0034524 A1 * 2/2018 Pao ........................ H04L 1/1607
2018/0035438 A1 * 2/2018 Pao ....................... H04W 72/21
2018/0115358 A1 * 4/2018 Raghavan .............. H04B 7/026
2018/0115958 A1 * 4/2018 Raghavan .............. H04B 7/026
2018/0172816 A1 * 6/2018 Chiu ....................... G01S 13/26
2019/0331768 A1 * 10/2019 Harrison ............... G01S 13/726
2019/0339378 A1 * 11/2019 Zwirn ................... G01S 13/878
2019/0383904 A1 * 12/2019 Harrison ............... G01S 13/931
2019/0385023 A1 * 12/2019 Li ......................... G06F 18/214
2020/0037334 A1 * 1/2020 Pao ...................... H04B 7/0619
2020/0150260 A1 * 5/2020 Lang ..................... G01S 13/343
2020/0309938 A1 * 10/2020 Oren ..................... G01S 13/003
2021/0025976 A1 * 1/2021 Chandel ................ G06F 1/3231
2021/0027049 A1 * 1/2021 Chandel ................ G06F 1/3231
2021/0080557 A1 * 3/2021 Vaishnav ................ G01S 13/72
2021/0135733 A1 * 5/2021 Huang ................. H04B 7/0691
2021/0149039 A1 * 5/2021 Koike-Akino ....... H04B 7/0617
2021/0255300 A1 * 8/2021 Harrison ............... G01S 13/865
2022/0030440 A1 * 1/2022 Park ...................... H04W 16/28
2022/0044359 A1 * 2/2022 Harrison ............... G01S 13/865
2022/0065991 A1 * 3/2022 Zhang ..................... G01S 13/42
2022/0066014 A1 * 3/2022 Park ........................ G01S 13/42
2022/0066018 A1 * 3/2022 Han ...................... G01S 13/765
2022/0094397 A1 * 3/2022 Wu ...................... H04B 7/0617
2022/0103267 A1 * 3/2022 Jung ...................... G06N 3/045
2022/0180659 A1 * 6/2022 Chandel ................ G06F 1/3231
2022/0215508 A9 * 7/2022 Harrison ............... G01S 13/865
2022/0278791 A1 * 9/2022 Choi .................. G01C 21/3893
2023/0140890 A1 * 5/2023 Tyagi ................... G06N 3/0455 342/175
2023/0144333 A1 * 5/2023 Yoffe .................... G01S 13/931 342/70
2023/0280446 A1 * 9/2023 Ren ......................... G01S 13/89 342/202
2023/0280454 A1 * 9/2023 Zorgui .................... G01S 13/06 455/456.1
2023/0324532 A1 * 10/2023 Jeannin ................. G01S 13/003 342/36
2024/0094382 A1 * 3/2024 Tapia ...................... G01S 13/42
2024/0118410 A1 * 4/2024 Lin ....................... G01S 13/343
2024/0134038 A1 * 4/2024 Zhang ............... B60W 30/0956
2024/0188025 A1 * 6/2024 Raghavan ............. G01S 13/878
2024/0259984 A1 * 8/2024 Ghazvinian Zanjani .................... G06N 3/088
2025/0031089 A1 * 1/2025 Yu ......................... G01S 17/931
2025/0076445 A1 * 3/2025 Ashour ............... G01S 5/02526
2025/0110209 A1 * 4/2025 Sicron ..................... G01S 13/87
2025/0168684 A1 * 5/2025 Mandelli ............... H04W 24/10
2025/0192853 A1 * 6/2025 Cho ..................... H04B 7/0663
2025/0192855 A1 * 6/2025 Cho ....................... H04B 7/063
2025/0216506 A1 * 7/2025 Born ....................... G01W 1/10
2025/0294461 A1 * 9/2025 Barbu ................. H04W 52/028

* cited by examiner

SYSTEM AND METHOD FOR DMG PASSIVE SENSING IN AN ENVIRONMENT

TECHNICAL FIELD

The present disclosure relates generally to wireless sensing, and more specifically to a system and a method for passive directional multi-gigabit (DMG) Wi-Fi sensing.

BACKGROUND

Wireless fidelity (Wi-Fi) refers to a set of wireless networking technologies that allow different user devices to connect and communicate with each other without the need of physical cables. Wi-Fi has become an integral part of users' daily lives, serving as the backbone for communication, entertainment, remote working, virtual reality, industry-level IoT, and social connectivity. Wi-Fi uses radio communication signals to transmit data between different user devices. Wi-Fi is based on IEEE 802.11 family of standards which define protocols and specifications for implementing wireless communication between devices. Wi-Fi networks include one or more access points, which are devices that facilitate wireless communication between connected user devices. Wi-Fi signals can be used for detecting and tracking presence and movement of objects in an environment, which is generally referred to as Wi-Fi sensing.

In the 802.11 family of standards, IEEE 802.11bf is an evolving WLAN sensing standard, in which Wi-Fi sensing can be categorized, based on the operating frequency range, into—sub-7-GHz Wi-Fi sensing and directional multi-gigabit (DMG) Wi-Fi sensing at frequencies over 45 GHz. Compared with Wi-Fi at lower frequency bands, Wi-Fi signals at millimetre-wave (mmWave) frequency bands have significantly larger path loss. At a typical indoor range of 10 meters, Wi-Fi signal at 60 GHz may experience an additional 22-dB attenuation over the propagation at the 5 GHz band. Therefore, this path loss needs to be considered when using directional beamforming to compensate for such a large path loss.

Therefore, it is required to efficiently perform directional transmission and directional reception between Wi-Fi devices.

SUMMARY

It is an object of some embodiments to provide systems and methods for efficient directional transmission and directional receiving to reduce the path loss between two Wi-Fi devices. Specifically, some embodiments provide efficient Wi-Fi sensing using the directional transmission and directional receiving mechanism that was designed to reduce the path loss among multiple Wi-Fi devices.

One type of Wi-Fi sensing is directional sensing using packets sent or received with directional beampatterns, such as DMG sensing. Directional sensing often uses a combination of intra-packet and inter-packet measurements to accurately detect and characterize targets. Additionally, directional sensing may employ various signal processing techniques, such as pulse repetition frequency (PRF) changes, multiple packet transmissions, and advanced algorithms, to extract both slow-time and fast-time information from the received packets.

The distinction between intra-packet and inter-packet measurements is advantageous for adapting directional sensing algorithms to different scenarios and optimizing performance based on the dynamics of the observed targets. As used herein, the inter-packet measurements refer to the measurements of each packet of transmission, while the intra-packet measurements refer to the measurements within each packet transmission. For example, if the transmission is performed with five consecutive packets, the sensing can include five inter-packet measurements. However, modern technologies allow for sample reflection of each packet multiple times. For a typical Wi-Fi packet, it consists of preamble, header, and data. Each portion of the Wi-Fi packet can be sampled according to the sampling rate, yielding multiple intra-packet measurements. For example, if one portion of a Wi-Fi packet is measured 100 times, in this example the reflections are measured with 100 intra-packet measurements. For 5 consecutive Wi-Fi packets, we can collection 5*100 measurements in total.

The combination of inter-packet and intra-packet measurements gives the directional sensing the ability to evaluate each direction and/or angle between the target object and the transmitter independently. For example, if the 5 packets are sent for a specific direction, the difference in intra-packet measurements collected for different inter-packet measurements can indicate not only the distance to the target object but also its velocity.

However, in the context of the monostatic passive directional multi-gigabit (DMG) sensing with mmWave Wi-Fi beacon frames, the freedom of selecting the desired structure of beacon transmission that gives sensing advantages using a combination of inter-packet and intra-packet measurements is limited by the standard and the original purpose of the beacon transmission. This is because the beacon transmission is designed to establish a handshake between different Wi-Fi devices, and for such a handshake there is no need to transmit multiple packets toward each direction. As a result, a single packet is often sent to a direction or a sector making the independent sensing within each direction impractical.

It is an objective of some embodiments to provide a system and a method for object detection with millimeter-wave (mmWave) Wi-Fi beam training frames (i.e., sector sweep (SSW) frames or beacon frames) in a passive directional multi-gigabit (DMG) sensing configuration.

It is an object of some embodiments to provide a system and a method for passive directional multi-gigabit (DMG) sensing with millimeter-wave Wi-Fi beacon frames.

It is another object of some embodiments to provide such passive sensing that uses original beacon transmissions designed for beacon training in the transmissions defined in 802.11ad/ay standards. Unfortunately, for passive sensing, there is a need to transmit multiple packets in multiple directions. Such a transmission can take advantage of inter-packet and intra-packet measurements for adapting directional sensing algorithms to different scenarios and optimizing performance based on the dynamics of the observed targets. However, the 802.11ad/ay standards limit the freedom of selecting the desired structure of beacon transmission that gives sensing advantages using a combination of inter-packet and intra-packet measurements. This is because the beacon transmission is designed to establish a handshake between different Wi-Fi devices (including the access point—AP), allowing new Wi-Fi users at a distance to discover the presence of the AP and identify the directions for the subsequent data transmission between the users and AP. For such a handshake within a time constraint, there is less incentive to transmit multiple packets toward each direction; otherwise, the AP may not discover all new users in all possible directions and maintain connections to existing mobile users. As a result, a single packet is often sent to each direction for the benefit of device coverage and making the independent sensing within each direction impractical. Moreover, the number of total packets is limited by 802.11ad/ay standards to reduce the beam training overhead.

To that end, it is an object of some embodiments to provide a system and a method for directional sensing of a target based on a limited number of packets transmitted in each of the directions. With limited packet transmissions over a direction sector, it is challenging to analyze each sector of transmission independently of each other. However, some embodiments recognize a coupling between the inter-packet domain difference introduced by the target velocity and the inter-packet domain difference caused by transmissions over different directions. Hence, it is an objective of some embodiments to use that coupling to provide a joint signal model that uses all measurements of beacon transmission toward different directions to sense the target object. In other words, it is an object of some embodiments to provide a signal model that connects a known schedule of beacon transmission along different sectors implemented according to the specification of the 802.11ad/ay standard with measured reflections of such beacon transmission through parameters of objects causing such a reflection. Examples of parameters include one or a combination of a velocity of the object, an azimuth angle of the object, an elevation angle of the object, a distance to the object, and other motion features (e.g., acceleration) related to the object or the object parts (e.g., arms, legs)

Some embodiments are based on recognizing that such a join signal model can be provided using a notion of an occupancy map that couples multidirectional sensing into a unified signal structure.

An occupancy map is a representation used in robotics and automation to model and understand the environment in which a robot operates. It is typically a 2D or 3D grid where each cell represents a small area of the environment. The cells can be binary, indicating whether the area is occupied or free, or they can represent the probability of occupancy, or they can represent more features including the material properties of the grid, e.g., reflectivity at the mm Wave frequency band.

However, some embodiments are based on recognizing that the structure of the occupancy map can be extended to represent the parameters of the target object of interest. Evaluation of the occupancy map can and even should be performed jointly and statistically to take advantage of the coupling between beacon transmission along different directions, because transmission along one direction can have its effect in multiple grids. Hence, the statistical evaluation of the values of the occupancy map can connect the schedule of the multidirectional beacon transmissions with the inter-packet and the intra-packet measurements of the corresponding reflections.

To that end, it is an object of some embodiments to derive an explicit signal model that accounts for preamble structure, sector-level beam training, and receiver combination and develop a hypothesis testing-based adaptive detection that mitigates the background reflection via adaptive covariance estimation.

Additionally or alternatively, it is an objective of some embodiments to provide such a signal model that can detect an object (such as a person, a robot, a pet, a piece of furniture, and the like) in a scene from Wi-Fi measurements subject to an unknown interference.

To that end, some embodiments are based on a recognition that a signal model for processing Wi-Fi measurements should include (1) an object signal model for reflections of the transmitted signals forming the Wi-Fi measurements and (2) an interference signal model for the interference due to the reflection from the background such as the wall, ceiling, floor, furniture, etc.

Some embodiments recognize the coupling between transmissions over different directions that enables the possibility of having a joint signal model that uses all measurements of beacon transmission toward different directions to sense the target object. However, such a joint signal model would have at least three unknown variables of interest, i.e., the velocity, the angle (azimuth and elevation), and the distance to the object. Because the joint signal model does not assume independent evaluation of each direction, each of these variables depends on all of the measurements making this joint signal model computationally challenging.

Some embodiments are based on recognizing the differences among the variables of interest represented by the joint signal model. Specifically, velocity and angle rely on the cross-correlation among measurements of different directions of the join model heavier than the distance computation. In other words, the velocity and the angle can be captured by inter-packet measurements, while the distance can be captured by intra-packet measurements. This understanding allows us to arrive at a sparse signal model that quantizes three-dimensional space defined by velocity, angle, and distance dimensions differently for different dimensions. Specifically, the sparse model defines the quantized space partitioned into bins defined by the velocity quantization, the angle quantization, and the distance quantization. However, the velocity dimension and the angle dimension are quantized based on a number of inter-packet measurements in the beacon training, while the distance dimension is quantized based on a number of intra-packet measurements within an inter-packet measurement.

Unfortunately, the sparse signal model is noisier than the regular joint signal model. However, in the context of passive directional multi-gigabit (DMG) sensing with millimeter-wave Wi-Fi beacon frames the environment of the sensing can be learned or otherwise known, which reduces the noise to the practical level allowed in the passive sensing. Hence, the sparse signal model still allows a statistical evaluation of the presence of the object within different bins given the known background representation of the beacon training reflecting from the environment without the object on the quantized space.

Accordingly, one embodiment discloses a method for directional multi-gigabit (DMG) passive sensing with multidirectional millimeter-wave (mmWave) Wi-Fi beacon transmissions during directional beam training. The method includes collecting a schedule of mmWave Wi-Fi beacon transmissions including times and directional sector of each mmWave packet in the directional beam training. The method also includes statistically evaluating values of an occupancy map of an environment using a model connecting the schedule of the beacon transmissions with: intra-packet measurements and inter-packet measurements of reflections of the multidirectional mmWave Wi-Fi beacon transmissions. Further, the method includes determining parameters of an object in the environment based on the values of the occupancy map and outputting the parameters of the object.

According to another embodiment, a system for detecting an object is provided, the system comprising a memory configured to store instruction and a processor configured to store the instructions to execute a method comprising, collecting a schedule of multidirectional mmWave Wi-Fi beacon transmissions including times and directional sector of each mmWave packet in directional beam training. The method also comprises statistically evaluating values of an occupancy map of an environment using a model connecting the schedule of the beacon transmissions with: intra-packet measurements and inter-packet measurements, of reflections of the multidirectional mmWave Wi-Fi beacon transmissions. The method also includes determining parameters of the object in the environment based on the values of the occupancy map and outputting the parameters of the object.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms “for example,” “for instance,” and “such as,” and the verbs “comprising,” “having,” “including,” and their other verb forms, when used in conjunction with a listing of one or more components or other items, are each to be construed as open ended, meaning that that the listing is not to be considered as excluding other, additional components or items. The term “based on” means at least partially based on. Further, it is to be understood that the phraseology and terminology employed herein are for the purpose of the description and should not be regarded as limiting. Any heading utilized within this description is for convenience only and has no legal or limiting effect.

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. WLAN sensing or Wi-Fi sensing generally refers to a WLAN in which one or more WLAN devices monitor or map the environment using standard WLAN signals. For example, a Wi-Fi sensing system may use the signal reflections off of walls or other objects, including people, to map and measure the environment, and to identify and track objects within that environment.

Figure 1:
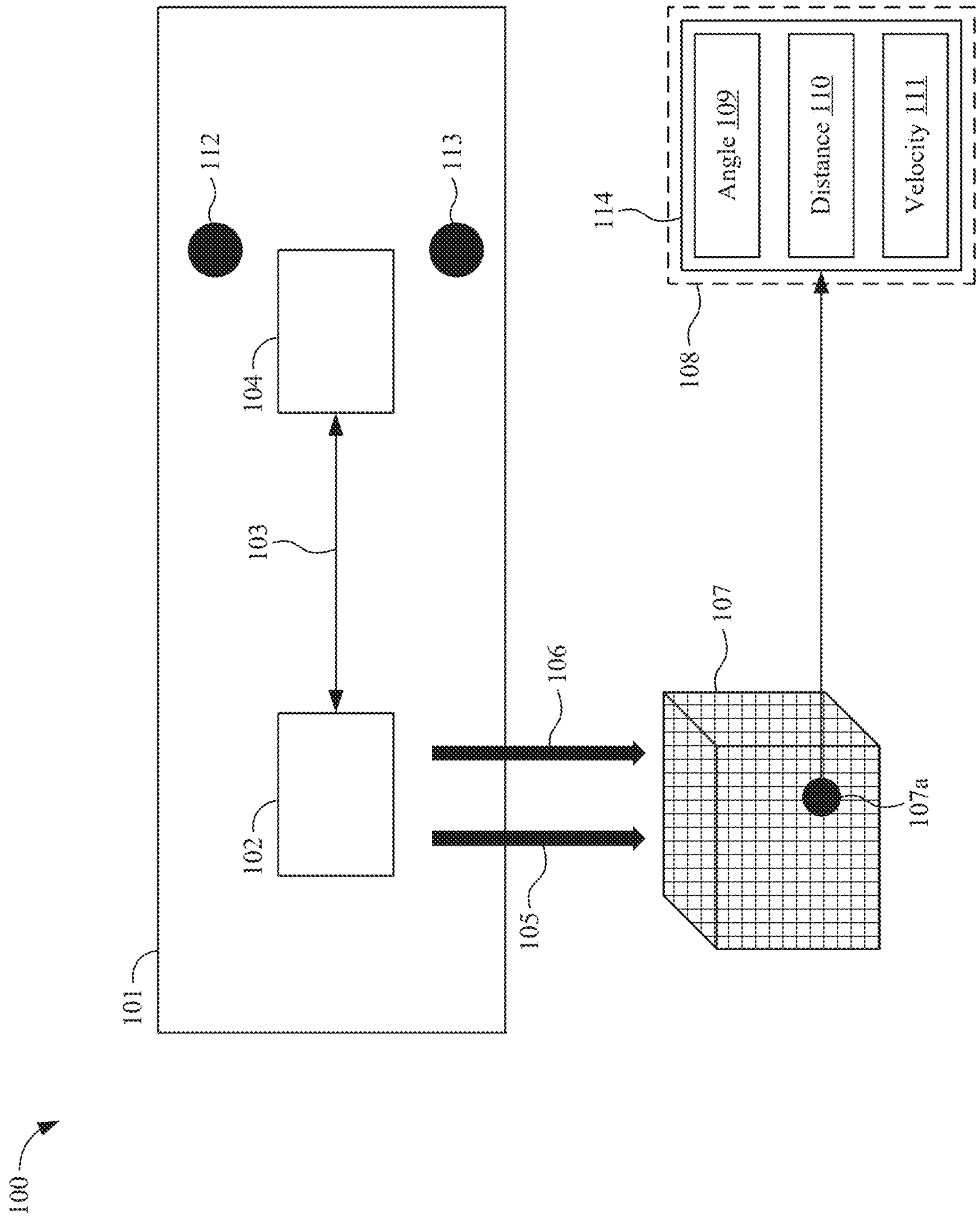
FIG. 1 illustrates a schematic of an environment diagram of a system for DMG passive sensing with multidirectional mmWave Wi-Fi beacon transmissions, according to an embodiment of the present disclosure.

FIG. 1 illustrates a schematic of an environment diagram 100 of a system 102 for DMG passive sensing with multidirectional mmWave Wi-Fi beacon transmissions, according to an embodiment of the present disclosure. The environment diagram 100 includes an environment 101 and one or more systems or devices—such as a system 102 and a system 104. Each of the one more systems may be any of—a transmitter, a receiver, an AP, an STA, a wireless communication terminal, a mobile device, a wireless communication routing terminal, and the like. The environment 101 also includes one or more objects, such as an object 112, and an object 113.

The one or more objects may be any of static objects, permanently static objects, intermittently static objects, moving objects, and the like. One of the one or more objects may be an object-of-interest, for which object detection may need to be performed in the environment 101. For example, the object 112 may be the object-of-interest in the environment, which may need to be detected and localized.

In an embodiment, the environment 101 may be an indoor environment, such as a room, a parking lot, a mall, a shop, a clinic, a human care facility, and the like. The detection of the object-of-interest may be done to perform any of one or more of activities such as gesture recognition, movement monitoring, fall detection, vital signs monitoring, elder care, remote troubleshooting, home automation and monitoring, tracking and surveillance, industrial automation monitoring, and the like.

The detection of the object may be done using DMG passive sensing with mmWave Wi-Fi beacon transmissions. Any of the one or more systems—the system 102 and the system 104 may be used to perform the DMG passive sensing described herein. For brevity of explanation, the operation of various embodiments would be described to be performed by the system 102 for the sake of example. However, such a description should not be construed as a limitation on the scope of the present disclosure, as may be understood by those of ordinary skill in the art.

In some embodiments, the system 102 is configured to collect a schedule 103 of the multidirectional mmWave Wi-Fi beacon transmissions including times and directional sector of each mmWave packet in the directional beam training. The system 102 is further configured to statistically evaluating values of an occupancy map 107 of the environment 101 using a model 114 connecting the schedule 103 of the beacon transmissions with: intra-packet measurements 105 and inter-packet measurements 106 of reflections of the multidirectional mmWave Wi-Fi beacon transmissions. The occupancy map 107 is used for determining parameters 114 of the object 112 in the environment 101 based on values 107*a* of the occupancy map 107. The parameters 114 of the object 112 include a velocity 111 of the object 112, a distance 110 of/to the object, and an angle 109 of the object 112 wherein the angle 109 further comprises an azimuth and an elevation. Once the parameters 108 of the object 112 are detected, they may be output for further application. For example, the parameters 108 of the detected object may then be used for localizing the object 112. For example, the system 102 may include an output interface which may be used to display the parameters 108 of the object 112.

Figure 2:
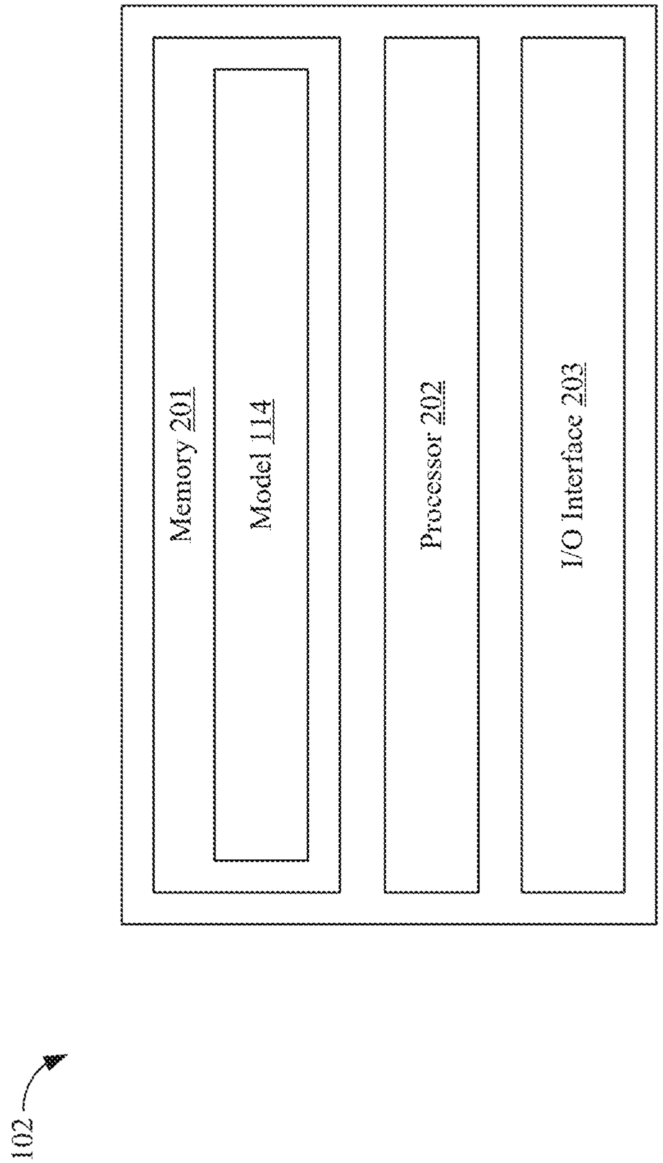
FIG. 2 illustrates a block diagram of a system for DMG passive sensing with multidirectional mmWave Wi-Fi beacon transmissions, according to an embodiment of the present disclosure.

FIG. 2 illustrates a block diagram of the system 102 for DMG passive sensing with multidirectional mmWave Wi-Fi beacon transmissions, according to some embodiments of the present disclosure. The system 102 includes a memory 201, a processor 202, and an input-output (I/O) interface 203. The system 102 may include fewer or more components, and the illustration of FIG. 2 is used for the purpose of explanation only, without limiting the scope of the present disclosure.

The memory 201 may store instructions, such as computer program instructions, which are executable by the processor 202 to conduct the operations of the system 102 described herein. The memory 201 may also store the model 114, which may be a joint signal model to model jointly the different parameters of the object-of-interest. Further the system comprises the I/O interface 203 which may be used to output the detected parameters of the detected object or the object-of-interest, such on a display interface. The system 102 collects the intra-packet measurements 105 and the inter-packet measurements 106 of reflections of the multidirectional mmWave Wi-Fi beacon transmissions within the environment 101. The system 102 uses the collected intra-packet measurements 105 and the inter-packet measurements 106 to then detect the object, such as the object 112 or the object 114, in the environment. To that end, the system 102 may be configured as a sensing devise to collect the intra-packet measurements 105 and the inter-packet measurements 106 and detect the object 112. In this example, the system 104 may be configured as the transmitter transmitting one or more beacons and the schedule 103 of the multidirectional mmWave Wi-Fi beacon transmissions including times and directional sector of each mmWave packet in the directional beam training.

In an alternate embodiment, the system 102 may be configured as the transmitter transmitting one or more beacons and the schedule 103 of the multidirectional mmWave Wi-Fi beacon transmissions including times and directional sector of each mmWave packet in the directional beam training, while the system 104 is configured as the sensing device to collect the intra-packet measurements 105 and the inter-packet measurements 106 and detect the object 112.

The sensing device may be configured to detect the object using DMG passive sensing with multidirectional mmWave Wi-Fi beacon transmissions. This is illustrated using a method shown in FIG. 3.

Figure 3:
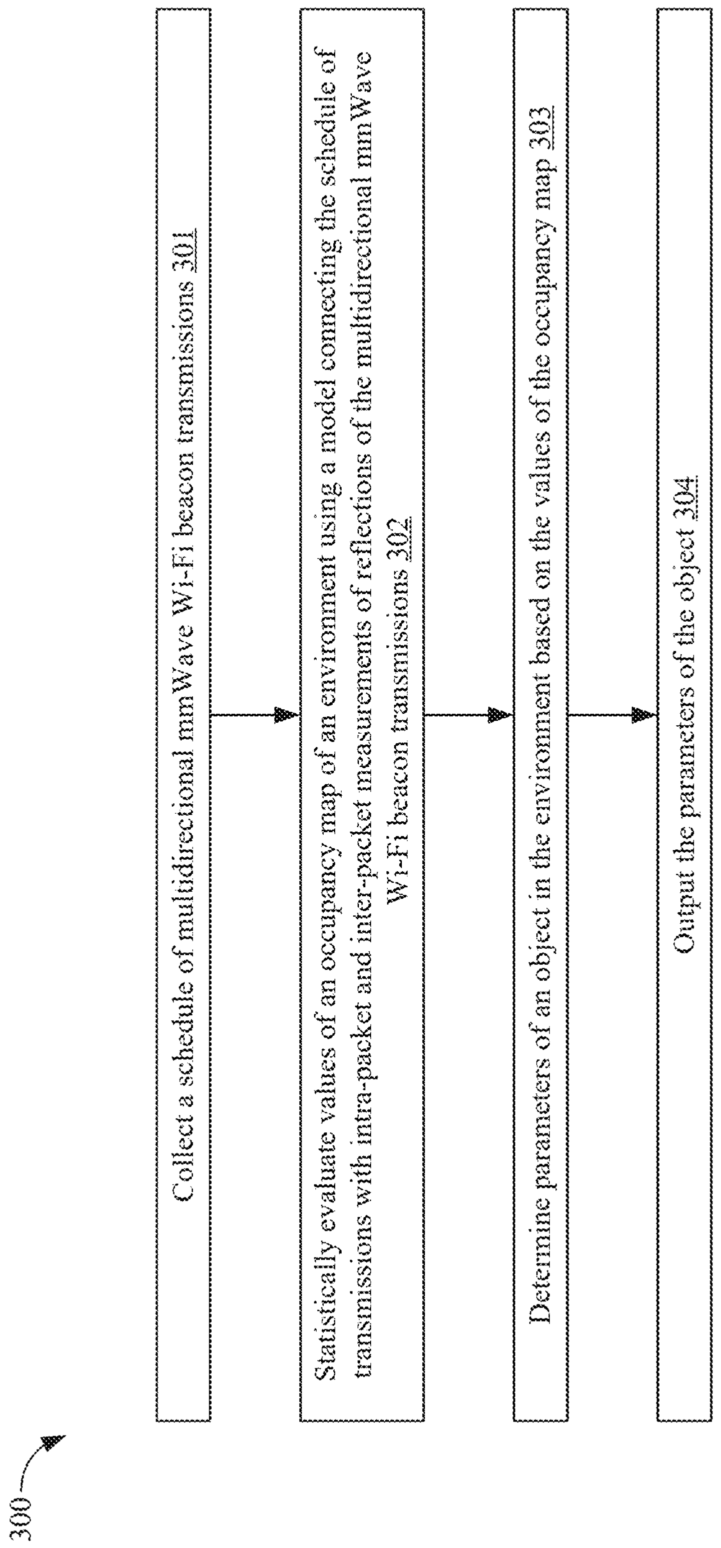
FIG. 3 illustrates a flowchart of a method for DMG passive sensing with multidirectional mmWave Wi-Fi beacon transmissions, according to an embodiment of the present disclosure.

FIG. 3 illustrates a flowchart of a method 300 for DMG passive sensing with multidirectional mmWave Wi-Fi beacon transmissions, according to an embodiment of the present disclosure. FIG. 3 is explained in conjunction with FIG. 1 and FIG. 2.

The method 300 includes, at 301, collecting a schedule of multidirectional mmWave Wi-Fi beacon transmissions during the directional beam training. The directional beam training and the schedule of multidirectional mmWave Wi-Fi beacon transmissions is shown in conjunction with FIG. 4A, FIG. 4B, and FIG. 4C.

At 302, a statistical evaluation of values of an occupancy map of an environment is done to connect the schedule of the multidirectional mmWave Wi-Fi beacon transmissions with inter-packet measurements and intra-packet measurements of the reflections of the multidirectional mmWave Wi-Fi beacon transmissions. This statistical evaluation is done using a model, which is a joint signal model that is used to jointly detect one or parameters of an object in the environment.

At 303, the model is used to determine the one or more parameters of the object based on the values of the occupancy map. The parameters of the object include, in an embodiment, a velocity of the object, a distance of the object, and an angle of the object. The object further including an azimuth and an elevation.

At 304, the parameters of the object are output, such as using the I/O interface 203 of the system 202.

Figure 4A:
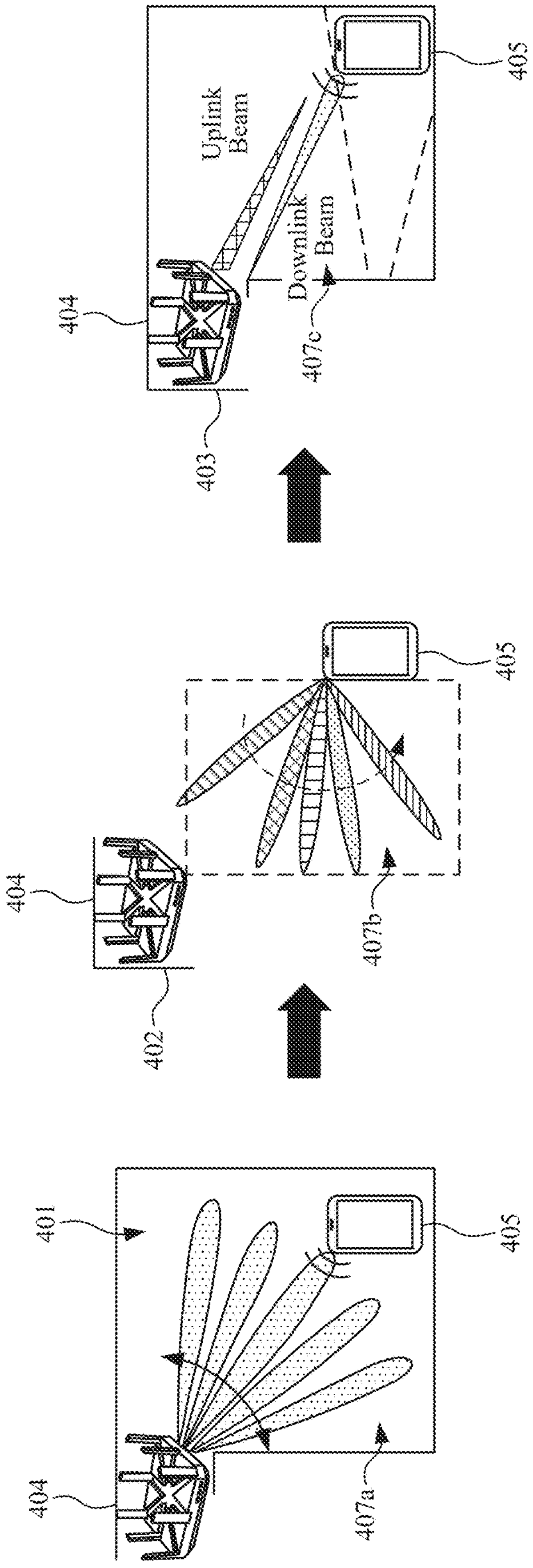
FIG. 4A illustrates a schematic of directional beam training, according to an embodiment of the present disclosure.

FIG. 4A illustrates a schematic of directional beam training, according to an embodiment of the present disclosure. The directional beam training includes different stages, such as a first stage 401, a second stage 402, and a third stage 403.

In the first stage 401, during directional beam training, an AP, such as the system 102 or the system 104 emits beacons to advertise their presence. For example, an AP 404 acts as a communication transmitter and transmits beacons 407*a* in different directions, which may be precepted by a STA 405, which acts as a communication receiver. It may be understood that any of the AP 404 and the STA 405 may be considered equivalent to the system 102 or the system 104 shown in FIG. 1. The objective of these beacons is to scan an environment with the AP 404, and the STA 405 can listen in different directions and also perform scanning in different directions. The beacons are omni-directional and are transmitted from the AP 404 every 100 ms as per IEEE 802.11 ad/ay communication standards.

In the second stage 402, the STA 405 performs beam scanning 407*b* in different directions, so that in the third stage 403, a best beam pair 407*c* is identified for communication between the AP 404 and the STA 405. The best beam pair 407*c* may be identified using signal strength measurements calculated at the AP 404 side and the STA 405 and sending these as feedback during scanning in either direction.

Figure 4B:
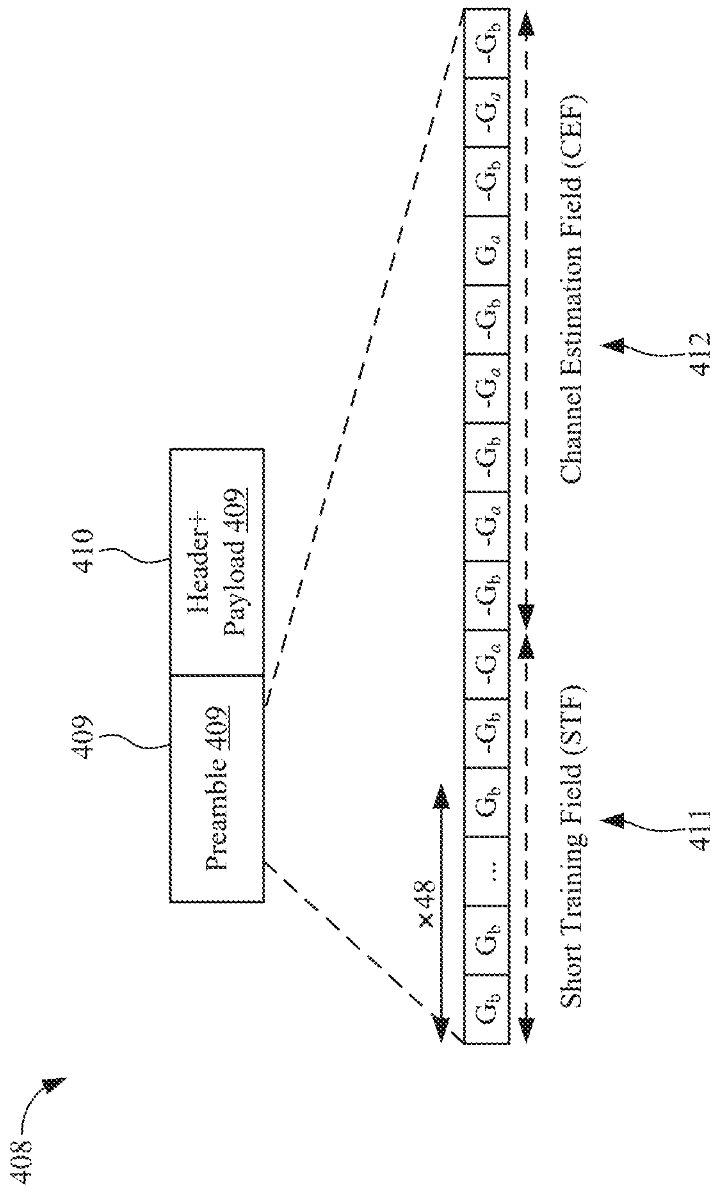
FIG. 4B illustrates a frame structure of a beacon frame transmitted by the AP, according to an embodiment of the present disclosure.

Each beacon is transmitted in the form of a beacon frame, which is further illustrated in FIG. 4B.

FIG. 4B illustrates a frame structure of a beacon frame 408 transmitted by the AP 404. The beacon frame 408 comprises a preamble 409 field and a header and payload 410 field. The preamble 409 further comprises a short training field (STF) 411 and a channel estimation field (CEF) 412. The STF 411 is used for signal detection, timing, and coarse frequency correction. STF sequences are designed using a base binary sequence. For example, one STF might include the base binary sequence [−1, −1 −1 +1 +1 +1 −1, +1, +1 +1 −1 +1 +1 −1, +1]. The CEF 412 is used for fine frequency and channel estimation. The STF 411 and the CEF 412 may be provided in the form of Golay sequences. A Golay sequence is a pair of binary sequences with a non-periodic autocorrelation function of zero. They are also known as Golay complementary sequences or Golay pairs. Golay sequences are often defined over an alphabet of size 2 (binary), 4 (quaternary), or 8 (octary). They are characterized by the property that the sum of their aperiodic autocorrelation functions equals zero, except for the zero shift. As illustrated in FIG. 4B, $G_a$ and $G_b$ are Golay complementary sequences of length 128 bits. The beacon frames having the structure shown in FIG. 4B may be used to perform directional beam training in different phases as per a schedule of multi-directional mmWave Wi-Fi beacon transmissions, as shown in FIG. 4C.

Figure 4C:
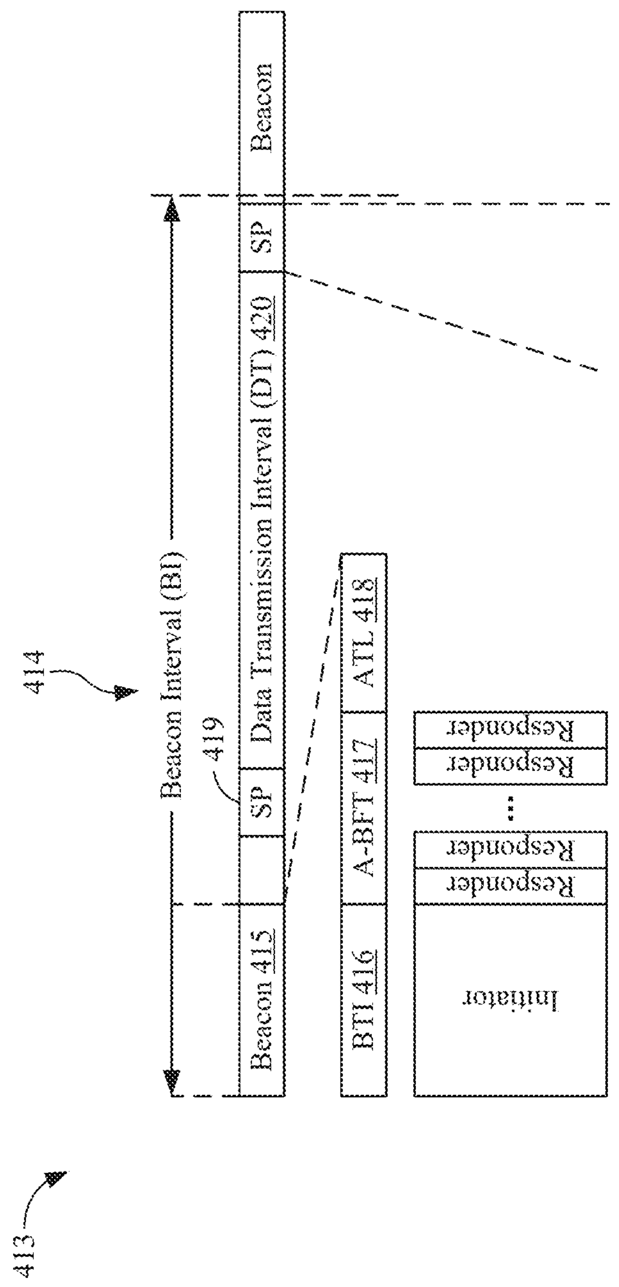
FIG. 4C illustrates different phases in a schedule of multi-directional mmWave Wi-Fi beacon transmissions, according to an embodiment of the present disclosure.

FIG. 4C illustrates different phases in a schedule 413 of multi-directional mmWave Wi-Fi beacon transmissions, according to an embodiment of the present disclosure. The schedule 413 of the multi-directional mm Wave Wi-Fi beacon transmissions includes different phases, such as a beacon transmission phase 415, a service period (SP) 419 phase, and a DTI 420 phase, which are periodically transmitted during a beacon interval 414. Each beacon interval may be 100 ms in an example.

The beacon phase 415 itself comprises three phases—a downlink phase which is a BTI phase 416, and an uplink phase which is an A-BFT phase 417, and an ATI phase 418. The BTI phase 416 includes multiple beacons or beacon frames transmitted by a communication initiator, such as an access point. The A-BFT phase 417 comprises multiple SSW frames transmitted by a communication responder, such as a STA.

During the DMG beam training initiated by the AP during the BTI phase 416 directional frames are transmitted over sector-level beampatterns to probe devices and environment over different angle sectors as shown in step 401 of FIG. 4A. During this phase, multiple users can simultaneously compute their own received beam SNRs corresponding to each of the transmitted beampatterns using a quasi-omnidirectional receiving beampattern and identify their respective best beam for downlink data transmission. In the subsequent A-BFT phase 417, the users can train its (TX or RX) beampatterns by sending a sequence of (short) sector sweep (SSW) frames to the AP, as shown in 402 in FIG. 4 to identify the best beam for uplink data transmission. Data can then be exchanged in DTI phase 420, as shown in step 403 of FIG. 4A, with the best downlink and uplink beams that cover LOS path.

In an embodiment, the Golay sequence-based preamble 409 including short training field (STF) 411 and channel estimation field (CEF) 412 is repurposed for DMG Wi-Fi sensing.

In an embodiment of the present disclosure, the DMG passive sensing reuses directional beacon frames during BTI phase 416 for object detection. In an embodiment of a monostatic setting, the AP 404 sends the same directional beacon frames during BTI phase and an additional sensing receiver is used at the AP 404 to capture the reflected beacon frames, or the reflections of the beacon frames from objects-of-interest and the environment. The frame-to-frame TX-RX antenna gain thus forms inter-packet measurements 106 (due to the misalignment between the probing beampatterns and the object steering vector) to the frame-based slow-time samples for Doppler steering vector. The joint TX-RX steering vector has a Kronecker structure between the range-domain steering vector (formed by the delayed preamble matched filter output) and the Doppler steering vector element-wise weighted by antenna gains. Following that, rather than the sequential approach, the object detection is formulated as a binary hypothesis testing where both preamble and Doppler steering vector are utilized. Accordingly, the signal model 114 is generated, which uses a subspace-based object detector and a computational implementation of generalized likelihood ratio test (GLRT).

The schedule 413 comprises following steps-beacon phase 415, data transmission phase 420, and the beacon phase 415. Beacon is transmitted periodically, every 100 ms, in different directions. Direction is determined by the manufacturer of the transmitting system, such as the AP 404. So beacon is broadcasted periodically in these different directions. If there are multiple devices, such as access points (APs) or stations (STA) in an environment, they need to know which direction the beacon is being transmitted in, for efficient communication exchange. However, that is not always the case. Currently, the devices will receive the different beams of the beacon, calculate SNR at the device, and report back to the transmitter that indices of the best quality beam received by them.

Further, during the BTI (downlink) phase 416, beacon frames by AP/PCP may be re-used for downlink passive sensing, and during A-BFT (uplink) phase 417, (short) sector sweep (SSW) frames by non-AP STA may be reused for uplink passive sensing.

In an embodiment, TRN sequences may be added to beacon frames to enable STAs to sense in several directions to perform a process of a DMG sensing.

Figure 5A:
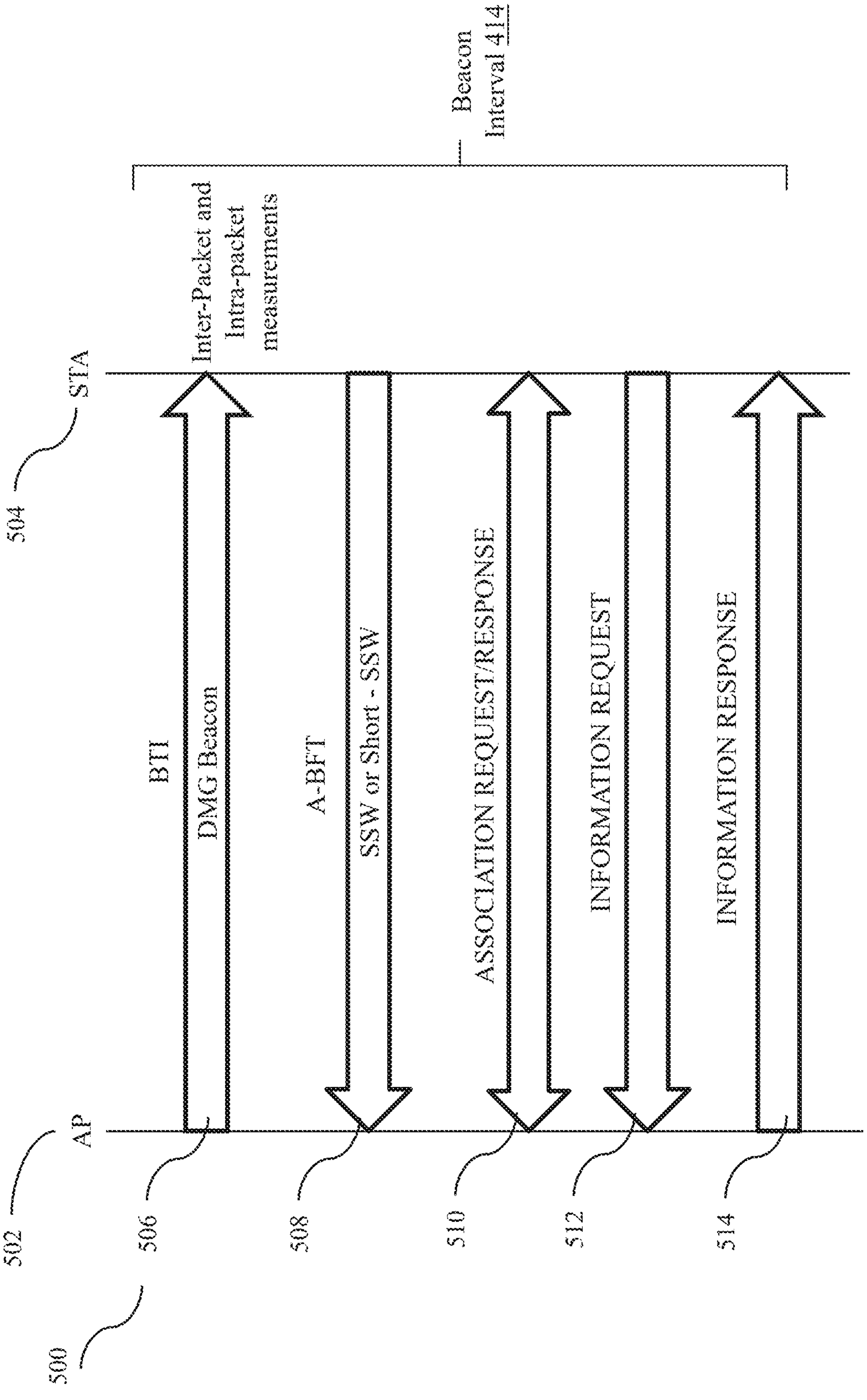
FIG. 5A illustrates a schematic diagram of a process of information exchange between an access point and a station as per a process of a DMG sensing session, according to an embodiment of the present disclosure.

FIG. 5A illustrates a schematic diagram of a process 500 of information exchange between an access point (AP) 502, such as the AP 404, and a station (STA) 504, such as the STA 405 as per a process of a DMG sensing session, according to an embodiment of the present disclosure.

In the example process 500, at 506 the AP 502 transmits DMG beacon frames during the BTI phase. The DMG beacon frames form beacon transmissions which are transmitted as per a schedule of beacon transmissions, such as the schedule of beacon transmissions illustrated in FIG. 4C. The beacon frames are equivalently referred to as the beacon packets. The beacon packets are as per mmWave Wi-Fi beacon format defined by wireless communication standard IEEE 802.11ad/ay standard protocol. The beacon transmissions include the inter-packet and the intra-packet measurements. To that end, the AP 506 is scanning the environment 101 at all times and keeps transmitting multidirectional beacon packets of mmWave Wi-Fi beacon transmission format. When there are one or more objects in the environment 101, the beacon packets are reflected from these one or more objects and as a result the AP 502, which may also be the system 102, receives the reflections of the beacon packets. These reflections are used to determine the intra-packet measurements and the inter-packet measurements.

Some embodiments include the system 102 collecting the intra-packet measurements and the inter-packet measurements of reflections of the multidirectional mmWave Wi-Fi beacon transmissions within the environment 101. In some embodiments, the reflections are caused by an object-of-interest. The object-of-interest may be an object with the system 102 is configured to tracking or detecting within the environment. Thus, the intra-packet measurements and the inter-packet measurements correspond to reflections of the multidirectional beacon transmissions caused by the object-of-interest.

Figure 5B:
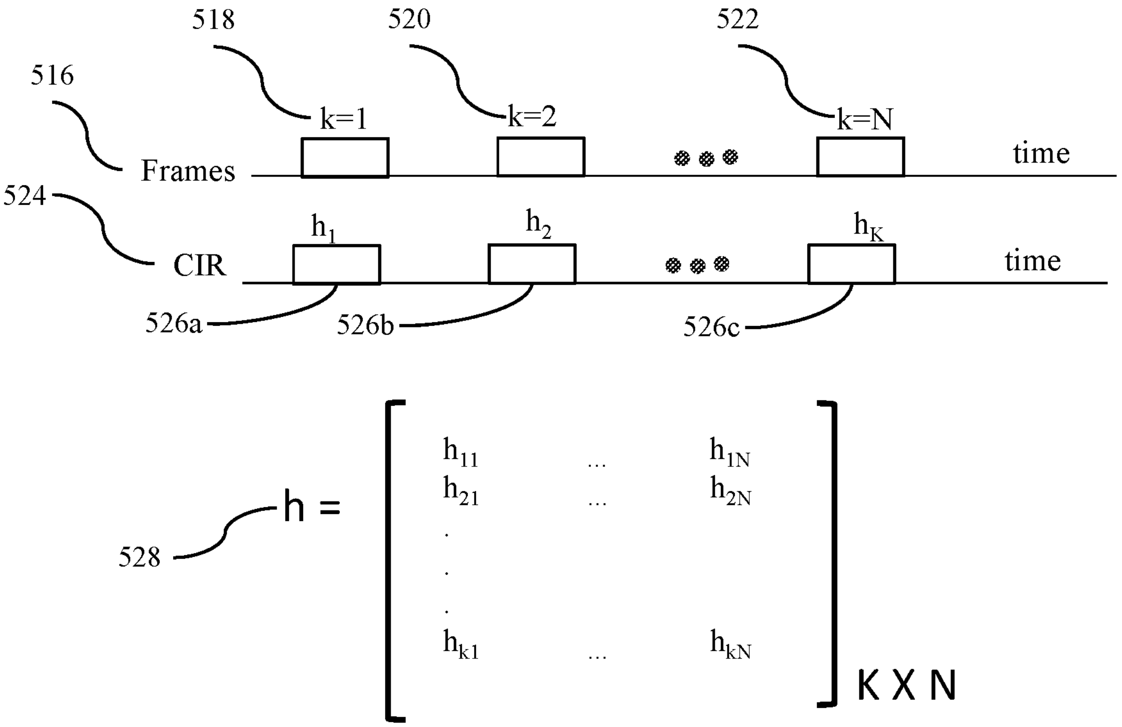
FIG. 5B illustrates example of inter-packet measurements and intra-packet measurements, in accordance with an embodiment of the present disclosure.

FIG. 5B illustrates example of inter-packet measurements 516 and intra-packet measurements, in accordance with an embodiment of the present disclosure. The inter-packet measurements 516 include different frames or beacon frames for different indices k, such an inter-packet measurement 518 for k=1, an inter-packet measurement 520 for k=2, an inter-packet measurement 522 for k=K, and the like. Within each inter-packet measurement, there may be samples of multiple intra-packet measurements. For example, for k=1, there may be N samples of intra-packet measurements at different sampling intervals.

The measurements may correspond to different parameters of a signal received by the system 102, such as after reflection from the object 112 to be detected. For example, one type of measurement is a channel impulse response CIR 524. For the inter-packet measurement 518, the corresponding measurement value for CIR is $h_1$ 526*a*, for the inter-packet measurement 520, the corresponding measurement value for CIR is $h_2$ 526*b*, and for the inter-packet measurement 522, the corresponding measurement value for CIR is $h_K$ 526*c*.

In some embodiments, $h_1$ is a vector of dimension 1×N, and overall value of the parameter h is represented as a vector 528 of dimension k×N, where each row includes N intra-packet measurements for an inter-packet measurement $h_k$ for the k-th row.

Some embodiments include the system 102 collecting the intra-packet measurements and the inter-packet measurements of permanently static objects caused by the multidirectional beacon transmissions. For example, if the environment 101 is a room, the permanently static objects include furniture in the room. To that end, the reflections of the multidirectional mmWave Wi-Fi beacon transmissions within the environment 101, by the furniture of the room are used to obtain the intra-packet measurements and the inter-packet measurements of the permanently static objects in the room.

Some embodiments include the system 102 collecting the intra-packet measurements and the inter-packet measurements of intermittently static objects in the environment 101. For example, if the environment 101 is a room, the intermittently static objects include such as a pet sleeping on a sofa. To that end, the reflections of the multidirectional mmWave Wi-Fi beacon transmissions within the environment 101, by the intermittently static objects are used to obtain the intra-packet measurements and the inter-packet measurements of the intermittently static object in the room.

In some embodiments, the measurements of the permanently static objects and the intermittently static objects form knowledge of the permanently static objects and intermittently static objects. This knowledge is used by the system 102 for detecting the object-of-interest, such as using the signal model 114. Also, as the beacon transmissions keep occurring periodically, the knowledge of the permanently static objects and intermittently static objects keeps getting updated. In some embodiments, the knowledge is updated when the object-of-interest is not within the environment 101. This knowledge thus forms background representation of objects for the signal model 114. The inter-packet measurements and the intra-packet measurements are further explained in FIG. 5B.

At 508, the STA 504 transmits SSW frames or short-SSW frames during the A-BFT phase 417 of the beacon interval 414. The AP 502 wants to sense the environment 101, so the AP 502 uses the SSW frames of the short-SSW frames to perform passive sensing of the environment 101.

Figure 5C:
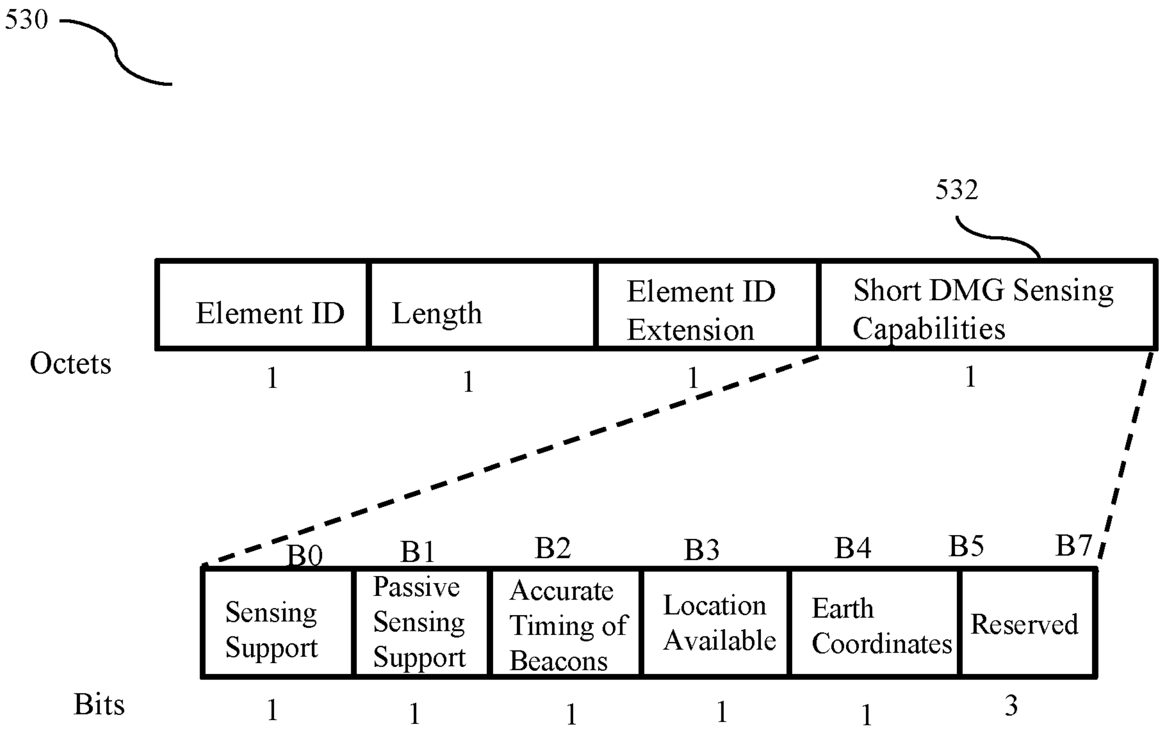
FIG. 5C illustrates an example of a DMG passive sensing beacon information element which is advertised by an AP, in accordance with an embodiment of the present disclosure.

In some embodiments, the AP 502 uses one bit in a DMG capabilities element to indicate that it supports passive sensing. FIG. 5C illustrates an example of a DMG passive sensing beacon information element 530 which is advertised by the AP 502 to indicate optional DMG sensing capabilities. The DMG passive sensing beacon information element 530 includes a field or a byte called short DMG sensing capabilities 532. The DMG sensing capabilities 532 field is set to 1 to indicate that the AP 502 supports any type of sensing. Under the field short DMG sensing capabilities 532 further eight bits are defined. For example, bit B1 bit is specified for passive sensing support, bit B2 is specified for accurate timing of beacons, bit B3 is specified for location availability of AP, and bit B4 is used for earth coordinate of AP. The bit B1 is set to 1 to indicate that the AP 502 supports DMG passive sensing. The bit B2 is set to 1 to indicate that SBIS, an inter-beacon interval, between beacon transmissions in the BTI phase 416 is exactly aSBIFSTime X $T_c\theta_2$ which are the timing parameters. The bit B3 indicates if the AP can provide its location and if yes then the bit B4 gives the coordinates of that location. The bit B3 is set to 1 when the AP 502 can provide an LCI field in a DMG passive sensing beacon information element.

At 510, An association request/response is then exchanged between the STA 504 and the AP 502. The association request/response includes, for example, logging into a Wi-Fi device corresponding to the AP 502 and/or the STA 504 for authentication. In order for a sensing device, such as the system 101 to perform accurate sensing and correct interpretation of the inter-packet measurements and the intra-packet measurements, the sensing device needs to know in which direction the beacon frames were transmitted. Further, the sensing device needs to know the location of the AP 502 and it is also important that the beacon frames are transmitted at high time accuracy. However, it may be expensive to transmit all this information in the beacon frames due to large number of bits and low bit rate of the beacon frames.

Some embodiments are based on using an information request sent at 512, by the sensing device, which may be the STA 504 in the example of FIG. 5A to achieve the objectives described above in a less complex and less expensive manner. The STA 504 transmits the information request to the AP 502 to know the details of the location, the direction and the timing of the beacon transmissions.

To that end, the STA 504 requests information about a DMG beacon frame transmission from the AP 502 by sending an information request frame with an element ID of the DMG passive sensing beacon information element in the request element field.

Figure 5D:
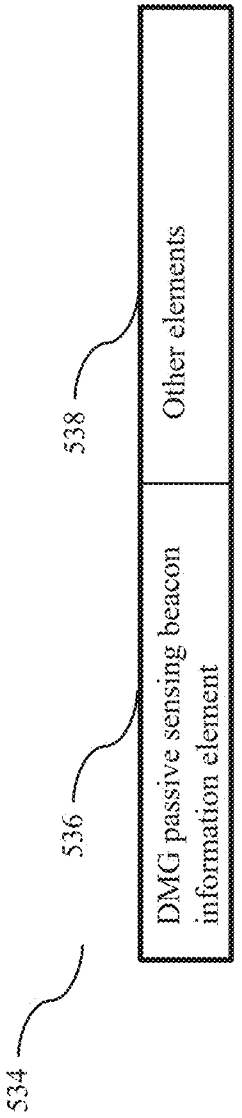
FIG. 5D illustrates an example diagram of an information request frame, in accordance with an embodiment of the present disclosure.

FIG. 5D illustrates an example diagram of an information request frame 534. The information request frame 534 includes a DMG passive sensing beacon information element 536 and some other elements 538. In response to the information request frame 534, at 514, the AP 502 transmits an information response report which includes all the information requested at 512 by the sensing device. The information response report is transmitted during the BTI phase 416 of the beacon interval 420. To that end, the information response report includes location of the AP 502, direction of each sector, and list of sector ids, azimuth and elevation. This information response report may then be used to perform object detection using the signal model 114 and the occupancy map 107 of the environment 101.

Figure 5E:
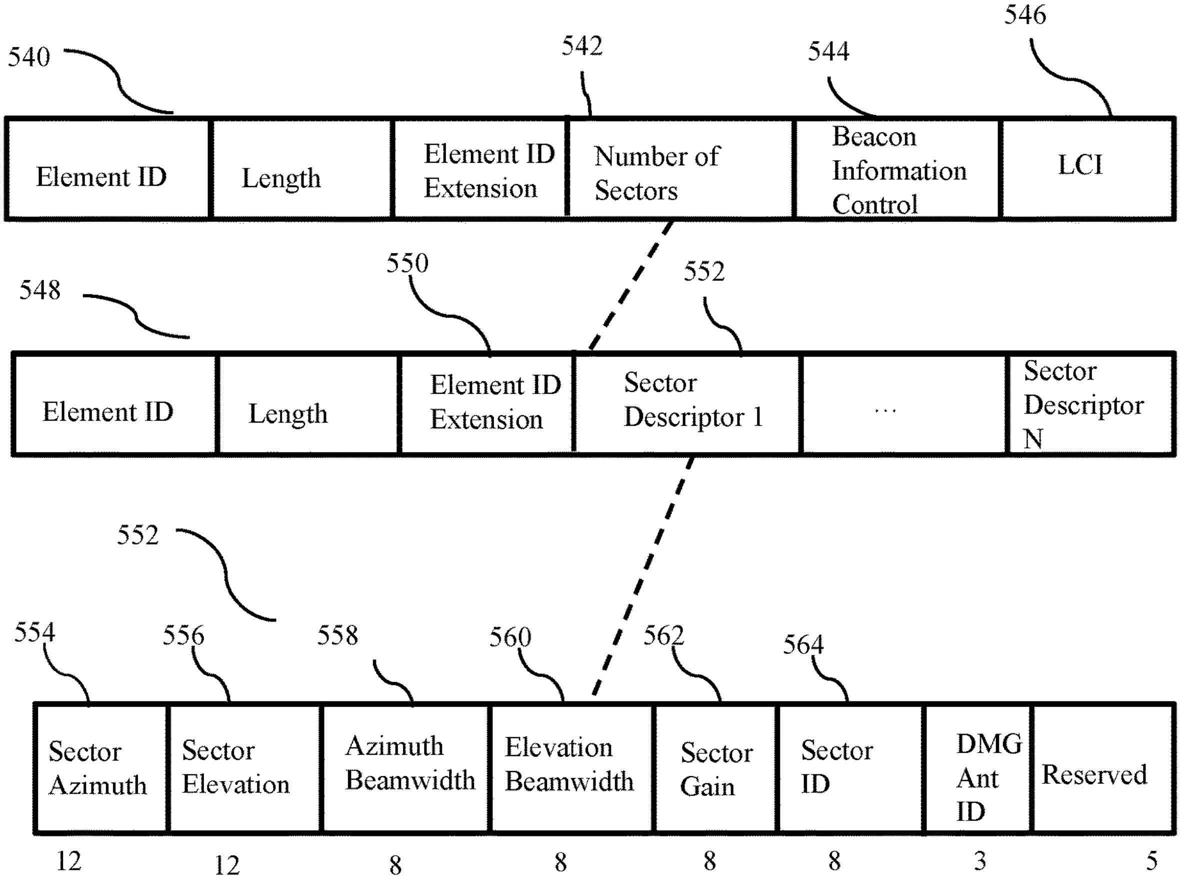
FIG. 5E illustrates a schematic of an information response report frame, in accordance with an embodiment of the present disclosure.

FIG. 5E illustrates a schematic of an information response report frame, also referred to hereinafter as an information response frame 540, according to an embodiment of the present disclosure.

The information response frame 540 includes a plurality of fields such as a number of sector field 542, a beacon information control field 544, an LCI field 546. The number of sectors field 542 contains the number of beacon sector descriptor fields in the attached beacon sector descriptors element. It is equal to the number of sectors used in the BTI. For the beacon information control field 544, a beacon constant field is set to 1 so that the AP 502 uses the same set of sectors in all BTIs. It is set to 0 otherwise. The beacon information control field 544 also includes next beacon field that is set to 1 to indicate that beacon sector descriptors describe the next BTI, it is set to 0 if they describe the previous BTI. It is reserved if the Beacon Constant field is set to 1. The LCI field 546 is optional.

The number of beacon sector descriptor fields defined by the number of sectors field 542 define a beacon descriptor element 548. The beacon descriptor element 548 contains a number of fields such as an element ID extension field and one or more sector descriptor 552 fields. Each sector descriptor 552 defined parameters of a sector and description of beampatterns. Each sector descriptor 552 field is of 8 bytes and contains further information such as a sector azimuth 554, a sector elevation 556, an azimuth beamwidth 558, an elevation beamwidth, a sector gain 562, a sector ID and the like. The information of the sector descriptor 552 field is used to identify steering vector $s_a$ in the joint signal model defined by:

$$y = \sqrt{E_S}\,\alpha_0[s_a(\theta_0)\odot s_d(v_0)]\otimes x_g(\tau_0) + \sum_{p=1}^{P}\sqrt{E_S}\,\alpha_p[s_a(\theta_p)\odot s_d(v_p)]\otimes x_g(\tau_p) + w \quad \text{Eq. (1)}$$

where, y is the signal as per the signal model 114, a) subindex 0 denotes the object of interest, b) $s_a(\theta_p)=[s_1(\theta_p), \ldots, s_a(\theta_p)]^T$ denotes the steering vector of the c) p-th object corresponding to k transmit-receive beam training directions, d)

$$\{\theta_k\}_{k=0}^{K}, s_d(v_p)$$

denotes the doppler steering vector of the p-th object, e) $x_g(\tau_p)$ denotes the delay steering vector of the pth object with dimension N×1, and w is the noise.

Further, in Eq. 1, the mutual coupling $s_a(\theta_0)\odot s_d(v_0)$ denotes a Kronecker structure.

In some embodiments, are based on a realization that reflections corresponding to p≠0 from the indoor environment such as wall, ceiling, ground, and furniture construct background clutter. Further, clutter-related path delays $\tau_p$ and angles $\theta_p$ stay the same but their amplitudes are random with a covariance distribution $C_P$.

The information from the information response frame 540 and the inter-packet and intra-packet measurements discussed earlier are then used to detect the parameters of the object-of-interest based on an occupancy map of the environment 101.

Figure 6:
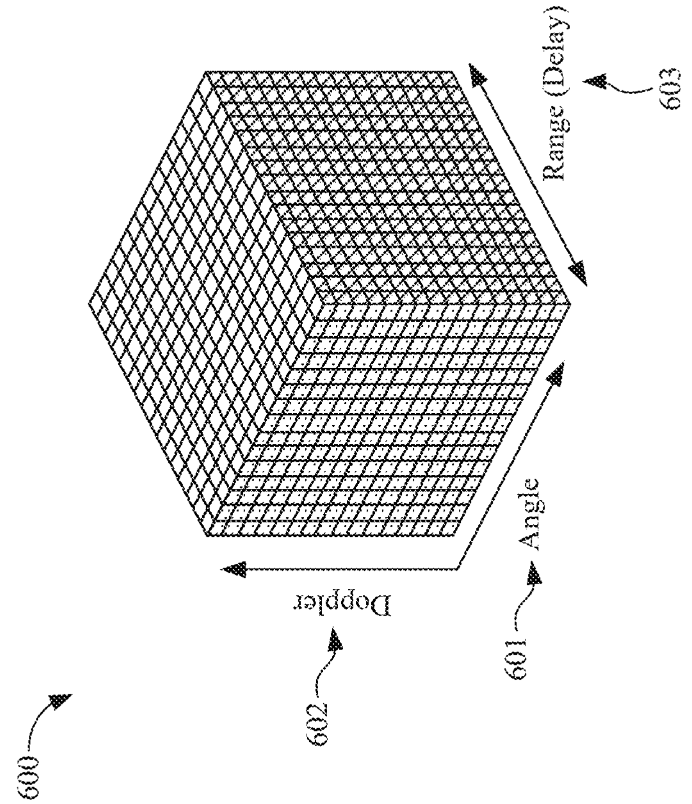
FIG. 6 illustrates an example occupancy map of the environment, according to an embodiment of the present disclosure.

FIG. 6 illustrates an example occupancy map 600 of the environment 101, according to an embodiment of the present disclosure. The occupancy map 600 comprises a 3-dimensional representation of the environment that partitions the environment into multiple 3D grids across three dimensions. The three dimensions include an angle dimension 601, a range or delay dimension 603 that is associated with a velocity value, and a doppler dimension 602 that is associated with a distance value. The occupancy map 600 thus represents a three-dimensional quantized space extending along a velocity dimension representing a velocity of the object, an angle dimension representing an angle of the object, and a distance dimension representing a distance to the object.

In an embodiments the velocity dimension and the angle dimension are quantized based on a number of inter-packet measurements in the beacon training. The inter-packet measurements are the values of the different beam direction frames.

The distance dimension is quantized based on a number of intra-packet measurements within an inter-packet measurement, such that the quantized space is partitioned into bins defined by the velocity quantization, the angle quantization, and the distance quantization. The intra-packet measurements are the measurements within a single beam's frames. For example, if there are k-beacon frames transmitted by an AP, then there are k inter-packet measurements. Further, within each frame if there n-samples of reflections of beacon frames, then there are N*k intra-packet frames. This is shown in FIG. 7.

Figure 7:
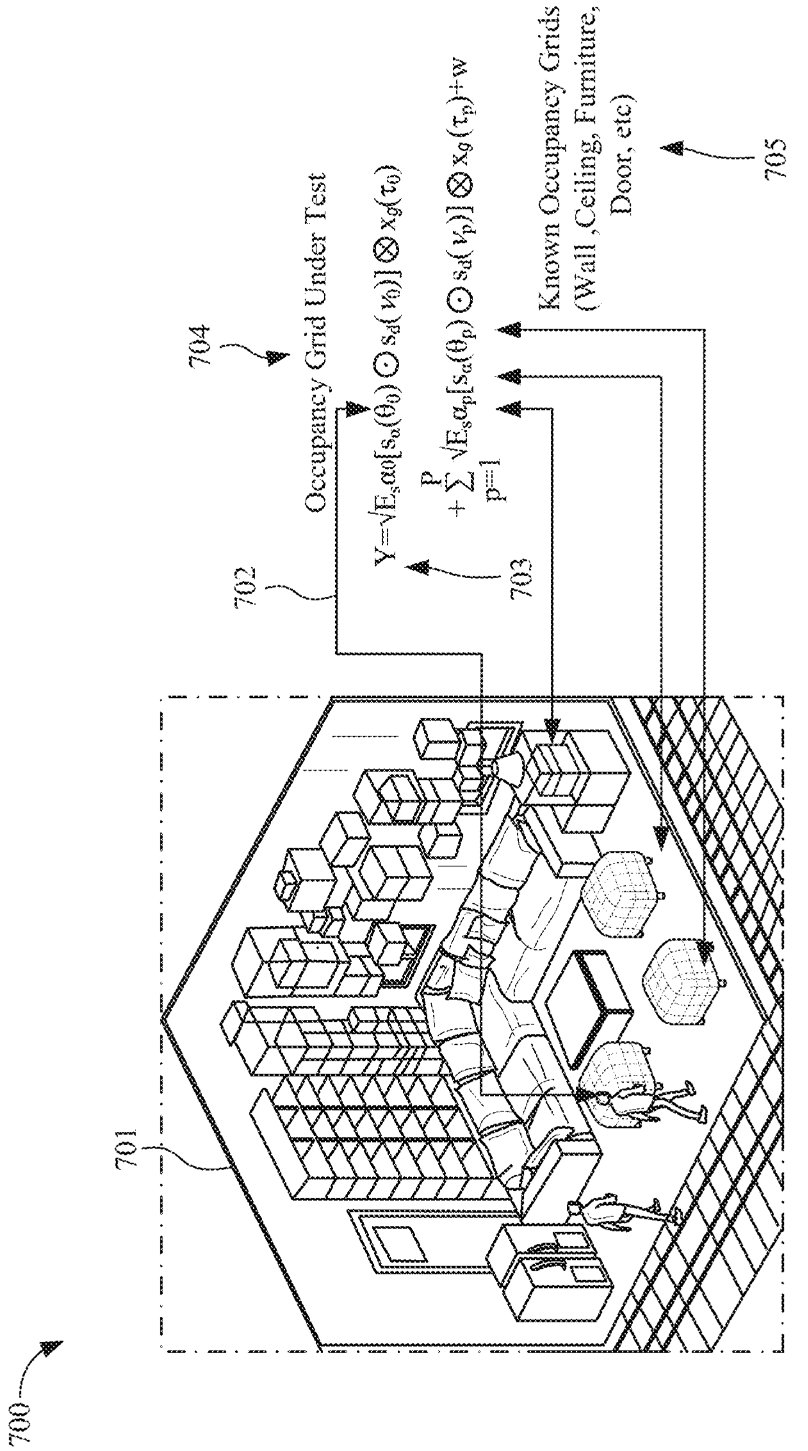
FIG. 7 illustrates an indoor environment which is partitioned into multiple grids, according to an embodiment of the present disclosure.

FIG. 7 illustrates an indoor environment 700 which is partitioned into multiple grids 701. A hypothesis testing is performed to detect an object in each of the multiple grids 701. To that end, the joint signal model 114 may be defined by a signal 703, y, sensed by a system, such as the system 104 as:

$$y = \sqrt{E_S}\,\alpha_0[s_a(\theta_0)\odot s_d(v_0)]\otimes x_g(\tau_0) + \sum_{p=1}^{P}\sqrt{E_S}\,\alpha_p[s_a(\theta_p)\odot s_d(v_p)]\otimes x_g(\tau_p) + w$$

where $s_a$ denotes the steering vector of an object responding to the K transmit-receive beam training directions, $s_d$ denotes the Doppler steering vector of an object, $x_g$ is the delay steering vector of an object, and w is the noise.

Here, the joint signal model 703 includes a background representation 705 of the beacon training reflecting from the environment without the object on the quantized space such as from the known occupancy grids of objects like wall, ceiling, furniture etc., when the environment 700 corresponds to a room.

The joint signal model 703 further includes a binary hypothesis function 704 defining an effect of a presence of the object in a bin of the quantized space given the background representation of the beacon training. The bins of the quantized space are then evaluated statistically with the binary hypothesis function 704 for the presence of the object to explain the collection of the inter-packet measurements by the joint signal model to estimate parameters of the object including one or a combination of the velocity of the object, the angle of the object, and the distance to the object. The statistical evaluation may be performed using a generalized likelihood ratio test (GLRT) in an embodiment.

For example, the GLRT may be evaluated as:

$$T = \frac{\left\| s_{rad}^{H} P_{H}^{\perp} y \right\|^{2}}{\left(s_{rad}^{H} P_{H}^{\perp} s_{rad}\right)\left(y^{H} P_{H}^{\perp} y\right)}$$

In an embodiments the joint signal model 114 includes a Kronecker structure modeling a connection between the distance quantization of the quantized space to a joint velocity and angle quantization.

Figure 8:
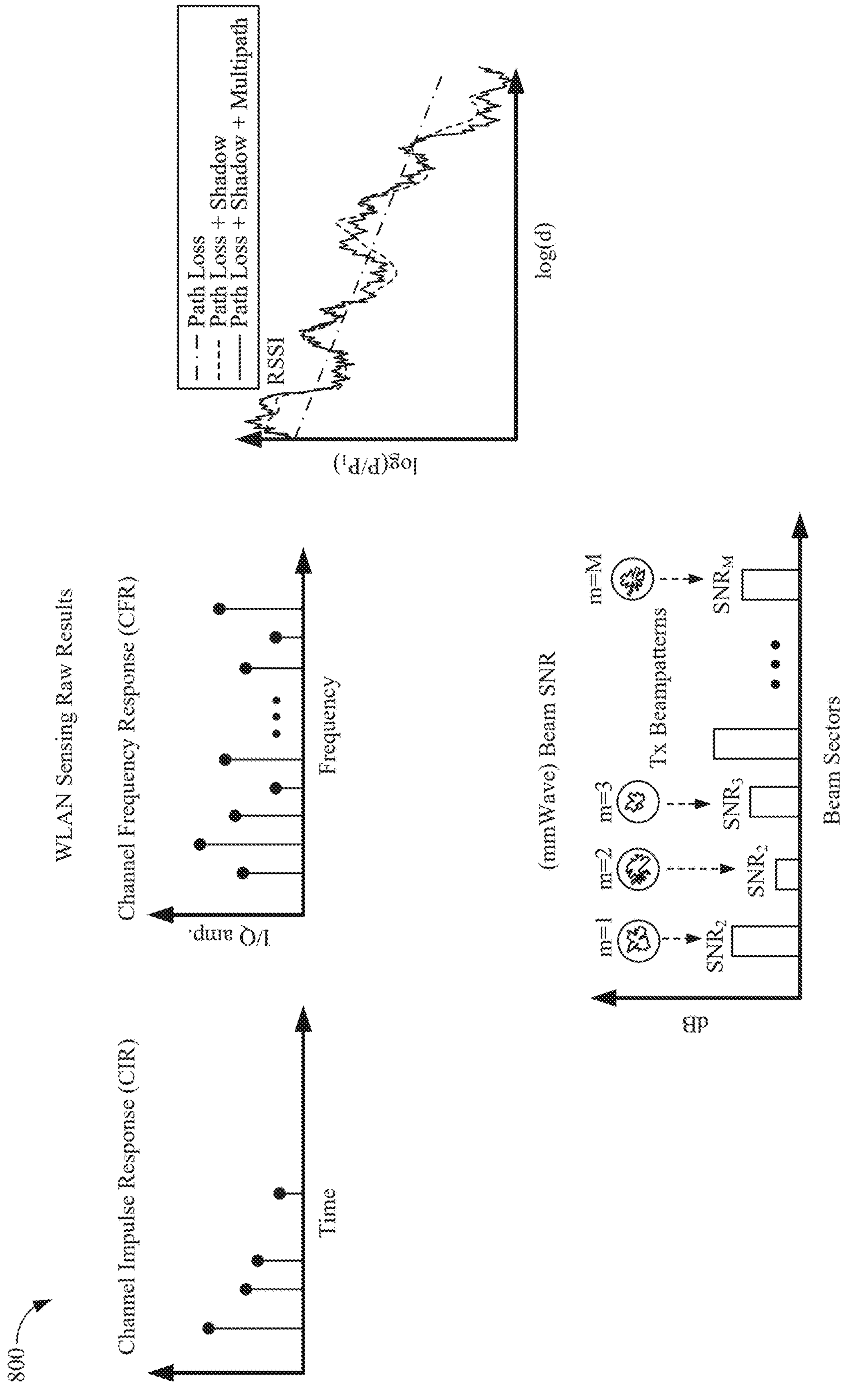
FIG. 8 illustrates examples of raw sensing results for DMG passive sensing, according to an embodiment of the present disclosure.

FIG. 8 illustrates examples of raw sensing results 800 for DMG passive sensing, according to an embodiment of the present disclosure. The raw sensing results 800 are conventional channel measurements used for, among others, channel estimation and equalization that are beneficial for data communication in later stages. The raw sensing results 800 are transformed by some embodiments to processed sensing results shown in FIG. 9.

Figure 9:
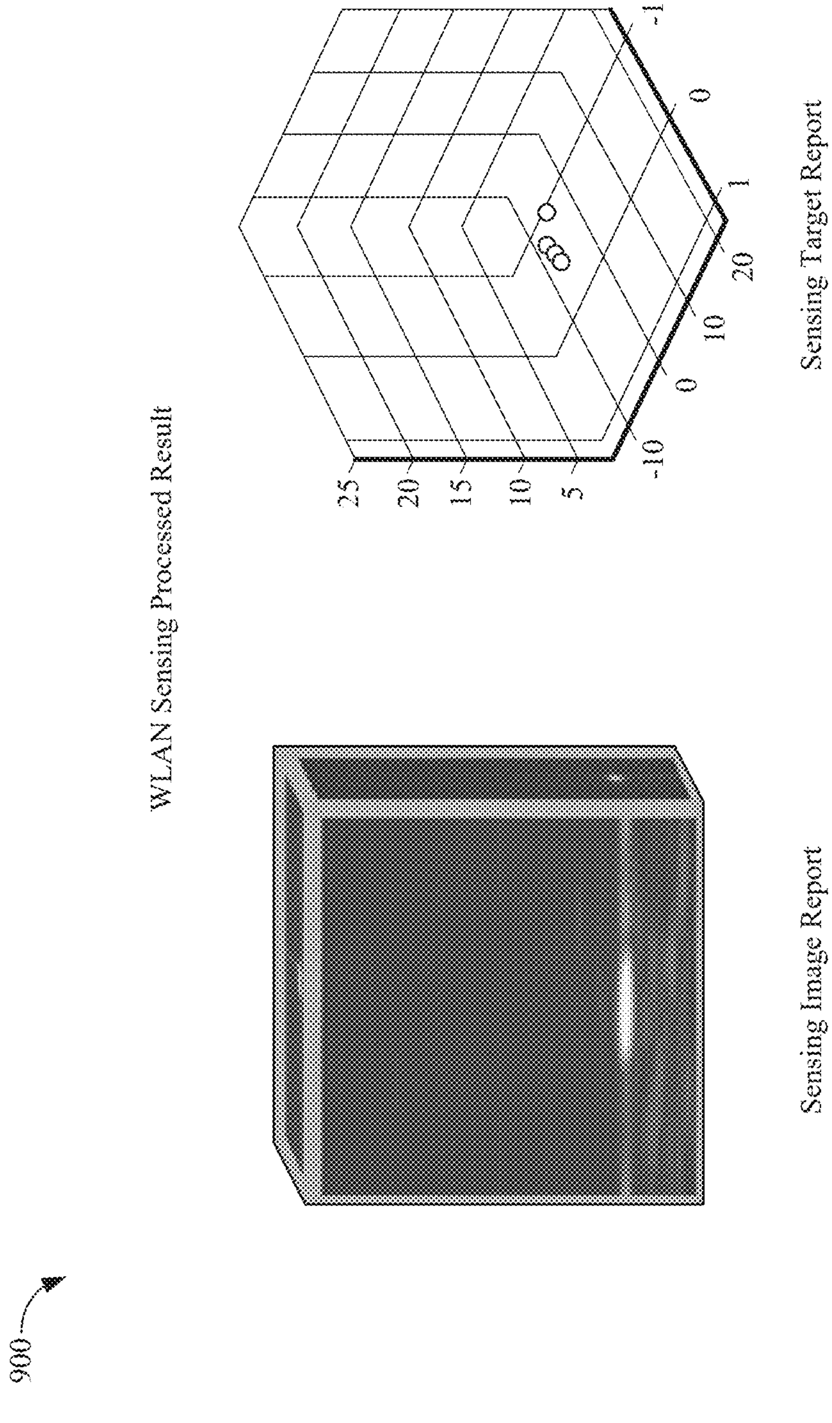
FIG. 9 illustrates examples of processed sensing results for DMG passive sensing, according to an embodiment of the present disclosure.

FIG. 9 illustrates examples of processed sensing results 900 for DMG passive sensing, according to an embodiment of the present disclosure. The processed sensing results 900 are further processing of raw sensing results or directly received packets towards the understanding of the environment.

Figure 10:
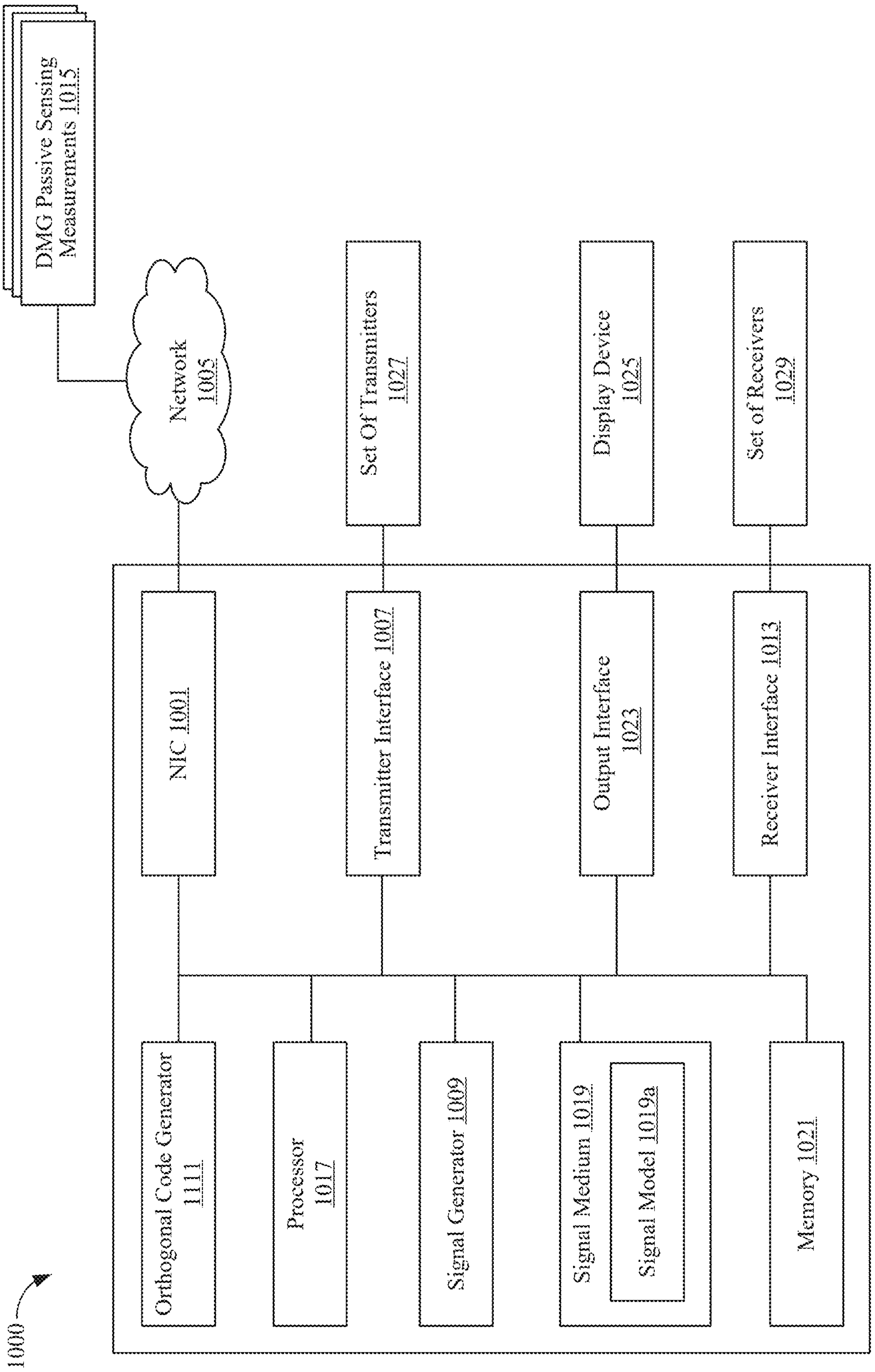
FIG. 10 illustrates a block diagram of a computing system for implementing the DMG passive sensing, according to an embodiment of the present disclosure.

FIG. 10 illustrates a block diagram of a computing system 1000 for implementing the DMG passive sensing, according to an embodiment of the present disclosure.

The computing system 1000 can have a number of interfaces connecting the computing system 1000 with other systems and devices. To that end, the computing system 1000 may be equivalent to the system 102 or the system 104 illustrated in FIG. 1. The computing system 1000 includes a network interface controller (NIC) 1001 that is adapted to connect the computing system 1000 through a bus 1003 to a network 1005 connecting the computing system 1000 with sensing devices. The computing system 1000 includes a transmitter interface 1007 configured to command a set of transmitters 1027 to transmit packets in a radio frequency (RF) band over a sequence of pulse repetition intervals (PRI). The transmitter interface 1007 is in communication with a signal generator 1009 that generates the packets.

Further, an orthogonal code generator 1111 is used to generate different orthogonal codes which are multiplied with the packets associated with each transmitter of the set of transmitters 1027. The computing system 1000 is connected to a set of receivers 1029 via a receiver interface 1013. The set of receivers 1029 is configured to collect measurements 1015 of the scene, through the network 1005. The measurements 1015 of the scene are sampled in a time-frequency domain within an intermediate frequency (IF) bandwidth to which reflection of the transmitted FMCW is shifted by mixing with a copy of the packets.

Further, the computing system 1000 includes a processor 1017 (equivalent to the processor 202 shown in FIG. 2) configured to execute instructions stored in a storage medium 1019 as well as a memory 1021 (equivalent to the memory 201 shown in FIG. 2). The processor 1017 can be a single core processor, a multi-core processor, a computing cluster, or any number of other configurations. The memory 1021 can include random access memory (RAM), read only memory (ROM), flash memory, or any other suitable memory systems. The storage medium 1019 may include random access memory (RAM), read only memory (ROM), flash memory, or any other suitable memory systems. The processor 1017 can be connected through the bus 1003 to one or more input and/or output (I/O) devices.

The storage medium 1019 is configured to store a signal model 1019*a* that is configured to jointly evaluate the measurements and beacon transmissions to determine the parameters of an object. In an embodiment, the signal model 319*a* explains the measurements for different quantized angles at a range-doppler bin as a sum of a binary classified Kronecker product of an ego-transmitter steering vector and an ego-receiver steering vector modifying an unknown angle and a Kronecker product of an interfering-transmitter steering vector and the ego-receiver steering vector modifying the unknown angle. Alternatively, in some embodiments, the signal model 1019*a* is configured to perform a hypothesis occupancy testing to identify the different parameters of the object as values of an occupancy map with multiple dimensions.

In an embodiment, the processor 1017 is further configured to evaluate measurements of different grids of the occupancy map independently from each other, wherein for evaluating the measurements of the grid, the processor 1017 is further configured to evaluates the presence of the hypothetical transmitter for each of different values of the first unknown angle to explain the measurements of the segment for different values of the second unknown angle. In some other embodiments, the processor 317 is further configured to evaluate the measurements of the grid statistically over multiple pulse repetition intervals using a generalized likelihood ratio test (GLRT).

The computing system 1000 includes an output interface 1023 configured to output the parameters associated with the object. The parameters include at least one of a velocity, an angle, and a distance to the object. The output interface 1023 may output the parameters on a display device 1025, store the parameters into a storage medium and/or transmit the parameters over the network 1005. For example, the computing system 1000 can be linked through the bus 1003 to a display interface adapted to connect the computing system 1000 to the display device 1025, such as a computer monitor, camera, television, projector, or mobile device, among others. Additionally, in some embodiments, the computing system 1000 is connected to an application interface adapted to connect the computing system 1000 to equipment for performing various tasks.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship with each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

List of Abbreviations

AP—Access Point
STA—Station
BTI—Beacon Transmission Interval
A-BFT—Association Beamforming Training
ATI—Announcement Transmission Interval
DTI—Data Transmission Interval
SSW—Sector Sweep
SP—Service Periods
CBAP—Contention Based Access Periods

We claim:

1. A method for directional multi-gigabit (DMG) passive sensing with multidirectional millimeter-wave (mmWave) Wi-Fi beacon transmissions during directional beam training, comprising:

collecting a schedule of the multidirectional mmWave Wi-Fi beacon transmissions including times and directional sector of each mmWave packet in the directional beam training;

statistically evaluating values of an occupancy map of an environment using a model connecting the schedule of the beacon transmissions with: intra-packet measurements and inter-packet measurements, wherein the intra-packet measurements and the inter-packet measurements are determined from reflections of the multidirectional mmWave Wi-Fi beacon transmissions, and wherein each inter-packet measurement of the inter-packet measurements comprises samples of the intra-packet measurements;

determining parameters of an object in the environment based on the values of the occupancy map; and outputting the parameters of the object.

2. The method of claim 1 further comprising collecting the intra-packet measurements and the inter-packet measurements of reflections of the multidirectional mmWave Wi-Fi beacon transmissions within the environment.

3. The method of claim 1 further comprising collecting the intra-packet measurements and the inter-packet measurements of an object-of-interest caused by the multidirectional beacon transmissions.

4. The method of claim 1 further comprising collecting the intra-packet measurements and the inter-packet measurements of permanently static objects caused by the multidirectional beacon transmissions.

5. The method of claim 1 further comprising collecting the intra-packet measurements and the inter-packet measurements of intermittently static objects caused by the multidirectional beacon transmissions.

6. The method of claim 1 further comprising utilizing knowledge of permanently static objects and intermittently static objects to assist the detection of an object-of-interest.

7. The method of claim 1 further comprising updating knowledge of permanently static objects and intermittently static objects when there is no object-of-interest in the environment.

8. The method of claim 1, wherein the parameters of the object include at least: a velocity of the object, a distance of the object, and an angle of the object wherein the angle comprises an azimuth and an elevation.

9. The method of claim 1, wherein the schedule of the multidirectional mm Wave Wi-Fi beacon transmissions corresponds to a beacon transmission interval (BTI) of the IEEE 802.11 ad/ay standard protocol.

10. The method of claim 1, further comprising:

generating a joint signal model connecting a combination of the intra-packet measurements for all the inter-packet measurements, to at least a three-dimensional quantized space extending along a velocity dimension representing a velocity of the object, an angle dimension representing an angle of the object, and a distance dimension representing a distance to the object, wherein the velocity dimension and the angle dimension are quantized based on a number of inter-packet measurements in the beacon training, and wherein the distance dimension is quantized based on a number of intra-packet measurements within an inter-packet measurement, such that the quantized space is partitioned into bins defined by the velocity quantization, the angle quantization, and the distance quantization.

11. The method of claim 10, wherein the joint signal model further comprises a background representation of the beacon training reflecting from the environment without the object on the quantized space, and a binary hypothesis function defining an effect of a presence of the object in a bin of the quantized space given the background representation of the beacon training.

12. The method of claim 11, comprising statistically evaluating the bins of the quantized space with the binary hypothesis function for the presence of the object to explain the collection of the inter-packet measurements by the joint signal model to estimate parameters of the object including one or a combination of the velocity of the object, the angle of the object, and the distance to the object.

13. The method of claim 12, wherein to produce the parameters of the object, the processor is configured to execute a generalized likelihood ratio test (GLRT) to statistically evaluate the bins.

14. The method of claim 11, wherein the joint signal model includes a Kronecker structure modeling a connection between the distance quantization of the quantized space to a joint velocity and angle quantization.

15. The method of claim 1, comprising emitting a limited number of packets transmission in each of a multiple directions to perform the directional beacon training, wherein the limited number of packets comprises a predefined threshold value of the number of packets.

16. The method of claim 1, wherein statistically evaluating values of the occupancy map comprises executing a neural network trained to output one or more parameters of the object based on the schedule of the beacon transmissions.

17. The method of claim 1, further comprising initiating by at least one of an access point (AP) or a station (STA), the collecting of the schedule of the multidirectional mmWave Wi-Fi beacon transmissions.

18. The method of claim 1, wherein the environment is an indoor environment.

19. The method of claim 18, wherein the occupancy map comprises a plurality of grids partitioning the indoor environment into different sections.

20. The method of claim 1, further comprising:

transmitting, by an access point (AP), the schedule of the multidirectional mmWave Wi-Fi beacon transmissions in a beacon frame, wherein the beacon frame comprises a sensing support field.

21. The method of claim 20, wherein the sensing support field is set to 1 to indicate that the AP supports DMG passive sensing.

22. The method of claim 20, further comprising:

transmitting, by at least one station (STA) device, an information request frame for obtaining information associated with the transmission of the beacon frame by the AP;

receiving, by the at least one STA device, an information response frame from the AP, the information response frame including at least: a DMG passive sensing beacon information element, and one or more DMG beacon sector descriptor elements, wherein the DMG beacon sector descriptor elements comprises: a sector azimuth field, a sector elevation field, an azimuth beamwidth field, and an elevation beamwidth field; and determining the parameters of the object based on the received information response frame.

23. A system for detecting an object, comprising:

a memory configured to store instructions; and a processor configured to store the instructions to execute a method comprising:

collecting a schedule of multidirectional mmWave Wi-Fi beacon transmissions including times and directional sector of each mmWave packet in directional beam training;

statistically evaluating values of an occupancy map of an environment using a model connecting the schedule of the beacon transmissions with: intra-packet measurements and inter-packet measurements, wherein the intra-packet measurements and the inter-packet measurements are determined from reflections of the multidirectional mm Wave Wi-Fi beacon transmissions, and wherein each inter-packet measurement of the inter-packet measurements comprises samples of the intra-packet measurements;

determining parameters of the object in the environment based on the values of the occupancy map; and outputting the parameters of the object.

* * * * *